United States Patent
Haapoja et al.

(10) Patent No.: US 11,403,824 B2
(45) Date of Patent: Aug. 2, 2022

(54) SYSTEMS AND METHODS FOR GENERATING MULTI-USER AUGMENTED REALITY CONTENT

(71) Applicant: SHOPIFY INC., Ottawa (CA)

(72) Inventors: Juho Mikko Haapoja, Toronto (CA); Byron Leonel Delgado, Ottawa (CA); Stephan Leroux, East Gwillimbury (CA); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 16/939,278

(22) Filed: Jul. 27, 2020

(65) Prior Publication Data
US 2022/0028170 A1    Jan. 27, 2022

(51) Int. Cl.
*G06T 19/00* (2011.01)
*G06T 7/70* (2017.01)
*G06F 3/16* (2006.01)
*G06Q 30/06* (2012.01)
*G06Q 30/00* (2012.01)
*G06Q 50/00* (2012.01)
*G06Q 10/08* (2012.01)
(Continued)

(52) U.S. Cl.
CPC .............. *G06T 19/006* (2013.01); *G06F 3/16* (2013.01); *G06T 7/70* (2017.01); *G06Q 10/0833* (2013.01);
(Continued)

(58) Field of Classification Search
CPC ............... G06F 2111/18; G06F 3/0481; G06F 3/04817; G06F 9/4443; G06F 3/04847; G06F 11/3664; G06F 3/012; G06F 3/0304; G06F 3/011–015; G06K 9/00664–00704; G06T 19/00;
(Continued)

(56) References Cited

U.S. PATENT DOCUMENTS 6,097,793 A * 8/2000 Jandel .................. H04L 12/5692
379/201.01
6,653,990 B1 * 11/2003 Lestruhaut .............. G06T 15/10
345/8
(Continued)

FOREIGN PATENT DOCUMENTS

CN           201281869 Y *  7/2009

OTHER PUBLICATIONS

Szeliski, Richard, "Computer Vision: Algorithms and Applications (Chapter 4: Feature detection and matching)", Sep. 3, 2010, pp. 205-266.
(Continued)

*Primary Examiner* — Todd Buttram

(57) ABSTRACT

Systems and methods are provided for the generation of augmented reality (AR) content that provides a shared AR experience involving multiple users. Shared AR experiences can improve the communication and collaboration between multiple simultaneous users. According to an embodiment, AR content is generated for a first user in a shared AR experience. The AR content includes at least one of a render of a model, a virtual representation of a second user of the shared AR experience, a virtual representation of a user interaction in the shared AR experience, and spatial audio content. Modifications to a shared AR experience are also provided. These modifications may be initiated based on instructions from one user and be reflected in the AR content generated for multiple users.

21 Claims, 29 Drawing Sheets

(51) Int. Cl.
*G06Q 30/02* (2012.01)
*G06Q 10/10* (2012.01)

(52) U.S. Cl.
CPC ........... *G06Q 10/10* (2013.01); *G06Q 30/012* (2013.01); *G06Q 30/0185* (2013.01); *G06Q 30/0201* (2013.01); *G06Q 30/0623* (2013.01); *G06Q 30/0633* (2013.01); *G06Q 30/0643* (2013.01); *G06Q 50/01* (2013.01); *G06T 2207/30196* (2013.01); *G06T 2219/024* (2013.01)

(58) Field of Classification Search
CPC ......... G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 2002/0095265 A1 | 7/2002 | Satoh et al. | |
| 2012/0105473 A1* | 5/2012 | Bar-Zeev | G06T 7/70 345/633 |
| 2012/0113223 A1* | 5/2012 | Hilliges | G06F 3/00 348/46 |
| 2016/0085305 A1* | 3/2016 | Spio | G06F 3/167 381/74 |
| 2016/0350973 A1* | 12/2016 | Shapira | G06F 3/017 |
| 2017/0262154 A1 | 9/2017 | Black et al. | |
| 2018/0137685 A1 | 5/2018 | Montgomerie et al. | |
| 2019/0114802 A1 | 4/2019 | Lazarow et al. | |
| 2019/0262701 A1* | 8/2019 | Forster | A63F 13/24 |
| 2020/0050256 A1* | 2/2020 | Yamamoto | G06F 3/017 |
| 2020/0174254 A1* | 6/2020 | Wieczorek | H04L 67/38 |
| 2022/0027115 A1 | 1/2022 | Haapoja et al. | |
| 2022/0028108 A1 | 1/2022 | Haapoja et al. | |

OTHER PUBLICATIONS

Debreczeni, Adam, "Multi-user AR experience". Published Jan. 17, 2018, but accessed Jun. 3, 2021. Available from https://blog.mapbox.com/multi-user-ar-experience-1a586f40b2ce.

* cited by examiner

| E-Commerce Platform | Search | | John's Apparel / Jonny B. Good (JG) |

- Home
- Orders
- Products
- Customers
- Reports
- Discounts
- Apps

SALES CHANNELS
- Online Store
- Mobile App

View all channels

⚙ Settings

Good afternoon, Jonny B..
Here's what's happening with your store today.

Today's total sales   Today's visits
$98.00                1

- Update your Platform Payments tax details
  We require additional information to verify your identity.
  [Update tax details]

- Advanced Cash on Delivery has been deactivated for your store
  [See why]

All channels ∨     Today ∨

TOTAL SALES
$98.00
$125
$75                                              Jun 1
$25                                              2 orders
12am    8pm    4pm    11pm TOTAL SALES BY CHANNEL    View dashboard    Jun 1
Online Store                                 0 orders
$0.00
Mobile app                                   0 orders
$0.00
Shopify POS (126 York St.)                   0 orders
$0.00

FIG. 2

SYSTEMS AND METHODS FOR GENERATING MULTI-USER AUGMENTED REALITY CONTENT

FIELD

The present application relates to augmented reality (AR), and in particular embodiments, to the generation of AR content.

BACKGROUND

AR relates to the enhancement of real-world experiences using computer-generated or virtual content. In some cases, AR involves superimposing virtual content over physical real-world content. This superposition can be either constructive or destructive. Constructive AR adds content to a real-world experience, whereas destructive AR masks content in a real-world experience. AR differs from virtual reality (VR). VR relates to the creation of a completely virtual experience, whereas AR maintains at least a portion of the real-world experience, but alters the perception of that real-world experience using virtual content.

SUMMARY

Some aspects of the present disclosure relate to the generation of AR content that provides a shared AR experience involving multiple users. This AR content can be referred to as "multi-user AR content". The multiple users may be separate from each other such that the users cannot physically see or interact with each other. However, despite the physical separation between the users, AR content for the shared AR experience can be mapped to the environment of each user. The shared AR experience allows the multiple users to simultaneously view the same virtual content, such as the same model of an item, for example.

In some embodiments, the AR content generated for a user in a shared AR experience includes a virtual representation of another user. Each user may be able to see how the other user(s) are positioned within the shared AR experience and/or how the other user(s) are viewing virtual content within the shared AR experience. This may provide context to improve communication between the different users, thereby helping to facilitate cooperation and collaboration within the shared AR experience.

In some embodiments, the AR content generated for a user in a shared AR experience includes spatial audio content. Spatial audio content can convey the directionality of a sound to a user, which can allow the user to appreciate where the sound originated from in the shared AR experience. For example, the voice of a first user in the shared AR experience can be recorded and the AR content for a second user can include the recording of the voice with a directionality corresponding to the position of the first user in the AR experience. This may provide a more intuitive and immersive shared AR experience.

In some embodiments, the AR content generated for a user in a shared AR experience includes virtual representations of user interactions within the AR experience. These virtual representations of user interactions can convey the interactions of one user to the other user(s) in the shared AR experience. Examples of such interactions include a user gesturing towards a virtual item in the AR experience and even touching the virtual item. Displaying virtual interactions in the AR experience may help enable non-verbal communication between the different users.

In some embodiments, user modifications to a shared AR experience are enabled to help improve cooperation and collaboration between different users. Modifying a shared AR experience can include modifying the viewpoint of at least one user's AR content. In an example, the viewpoint of one user in an AR experience is modified to match the viewpoint of another user in the AR experience, without either user having to physically move within their environments. In another example, a virtual item in a shared AR experience is modified for all users simultaneously.

According to one aspect of the present disclosure, a computer-implemented method is provided. The method may include obtaining a model of an item defined within a virtual coordinate system. A position of a first user within the virtual coordinate system may be determined based on first information obtained by a first device, and a position of a second user within the virtual coordinate system may be determined based on second information obtained by a second device. The method may also include obtaining, from the second device, audio of the second user. This audio may be an audio recording of the second user, for example. The method may further include generating AR content. The AR content may include a render of the model based on the position of the first user within the virtual coordinate system; a virtual representation of the second user based on the position of the second user relative to the position of the first user within the virtual coordinate system; and/or audio content based on the audio of the second user, the audio content comprising a directionality corresponding to the position of the second user relative to the position of the first user within the virtual coordinate system. The method may then output the AR content for presentation at the first device.

According to another aspect of the present disclosure, there is provided a computer-implemented method including obtaining a position of an interaction between a first user and virtual content presented at a first device. The virtual content, which may be AR content, includes a first render of a model defined within a virtual coordinate system. The position of the interaction may also be defined within the virtual coordinate system. The method may further include generating AR content. The AR content may include a second render of the model based on a position of a second user within the virtual coordinate system, the position of the second user being based on information obtained by a second device; and/or a virtual representation of the interaction based on the position of the interaction. The method may then include outputting the AR content for presentation at the second device.

According to yet another aspect of the present disclosure, there is provided a computer-implemented method including generating first AR content and outputting the first AR content for presentation at a device associated with a first user. The first AR content may include a first render of a model anchored within a virtual coordinate system, where the first render may be based on a position of the first user within the virtual coordinate system. The method may also include obtaining an instruction to reposition the first user to a position of a second user within the virtual coordinate system. The method may further include generating second AR content, where the second AR content includes a second render of the model based on the position of the second user within the virtual coordinate system. The second AR content may be output for presentation at the device.

According to a further aspect of the present disclosure, there is provided a computer-implemented method including generating first AR content that includes a first render of a model defined within a virtual coordinate system. The first AR content may be output for presentation at a first device. The method may also include modifying the model to produce a modified model defined within the virtual coordinate system. The step of modifying the model may be based on an instruction obtained by a second device presenting a second render of the model. The method may also include generating second AR content that includes a render of the modified model and outputting the second AR content for presentation at the first device.

According to another aspect of the present disclosure, there is provided a system including memory to store information such as models, measurements, positions and instructions, for example, and one or more processors configured to perform any method disclosed herein.

According to a further aspect of the present disclosure, there is provided a non-transitory computer readable medium storing computer executable instructions which, when executed by a computer, cause the computer to perform any method disclosed herein.

BRIEF DESCRIPTION OF THE DRAWINGS

Embodiments will be described, by way of example only, with reference to the accompanying figures wherein:

FIG. 2 is an example of a home page of an administrator, according to an embodiment;

DETAILED DESCRIPTION

For illustrative purposes, specific example embodiments will now be explained in greater detail below in conjunction with the figures.

Example E-Commerce Platform

In some embodiments, the methods disclosed herein may be performed on or in association with a commerce platform, which will be referred to herein as an e-commerce platform. Therefore, an example of an e-commerce platform will be described.

Figure 1:
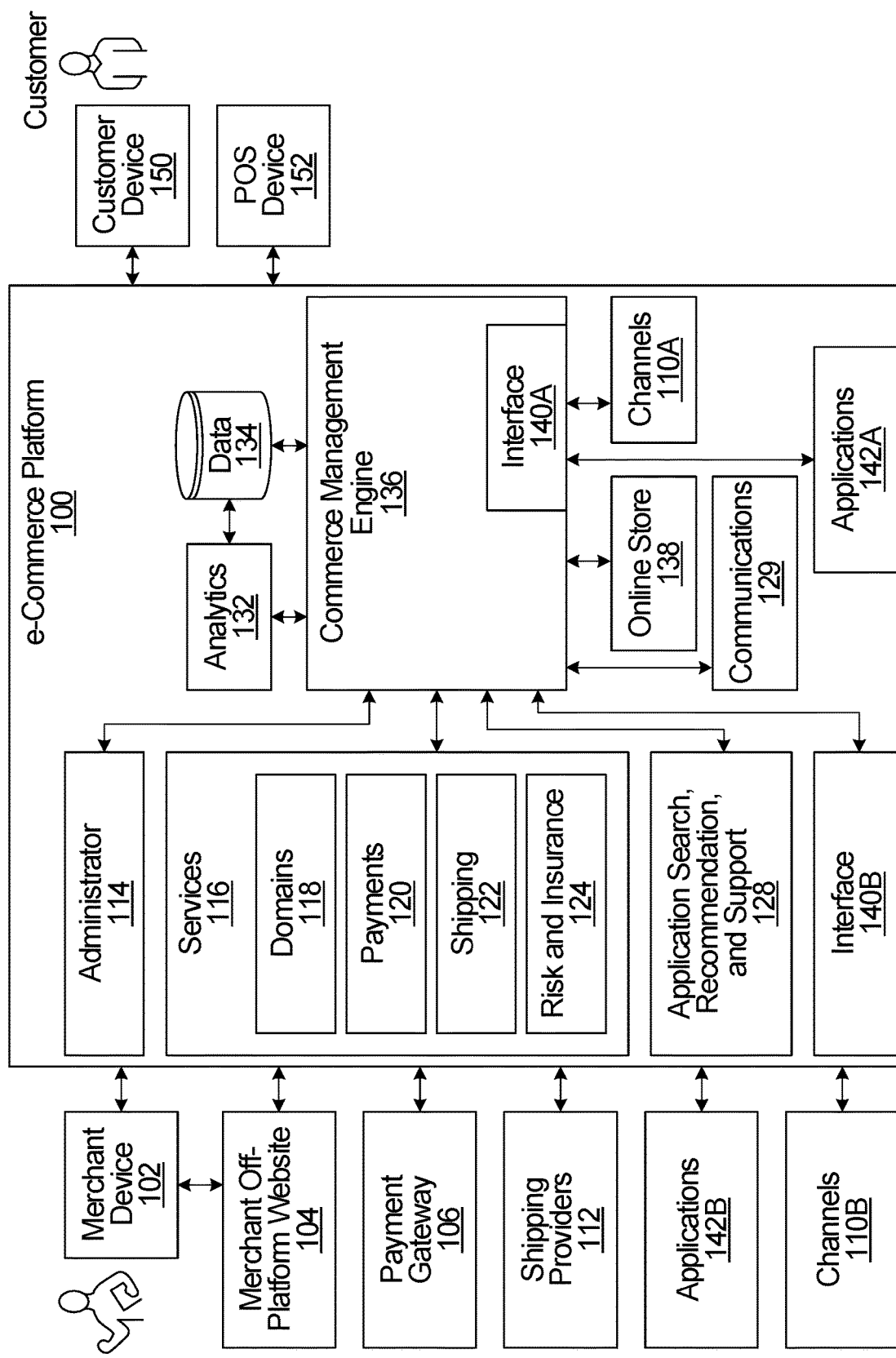
FIG. 1 is a block diagram of an e-commerce platform, according to an embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Augmented Reality in an E-Commerce Platform

Figure 3:
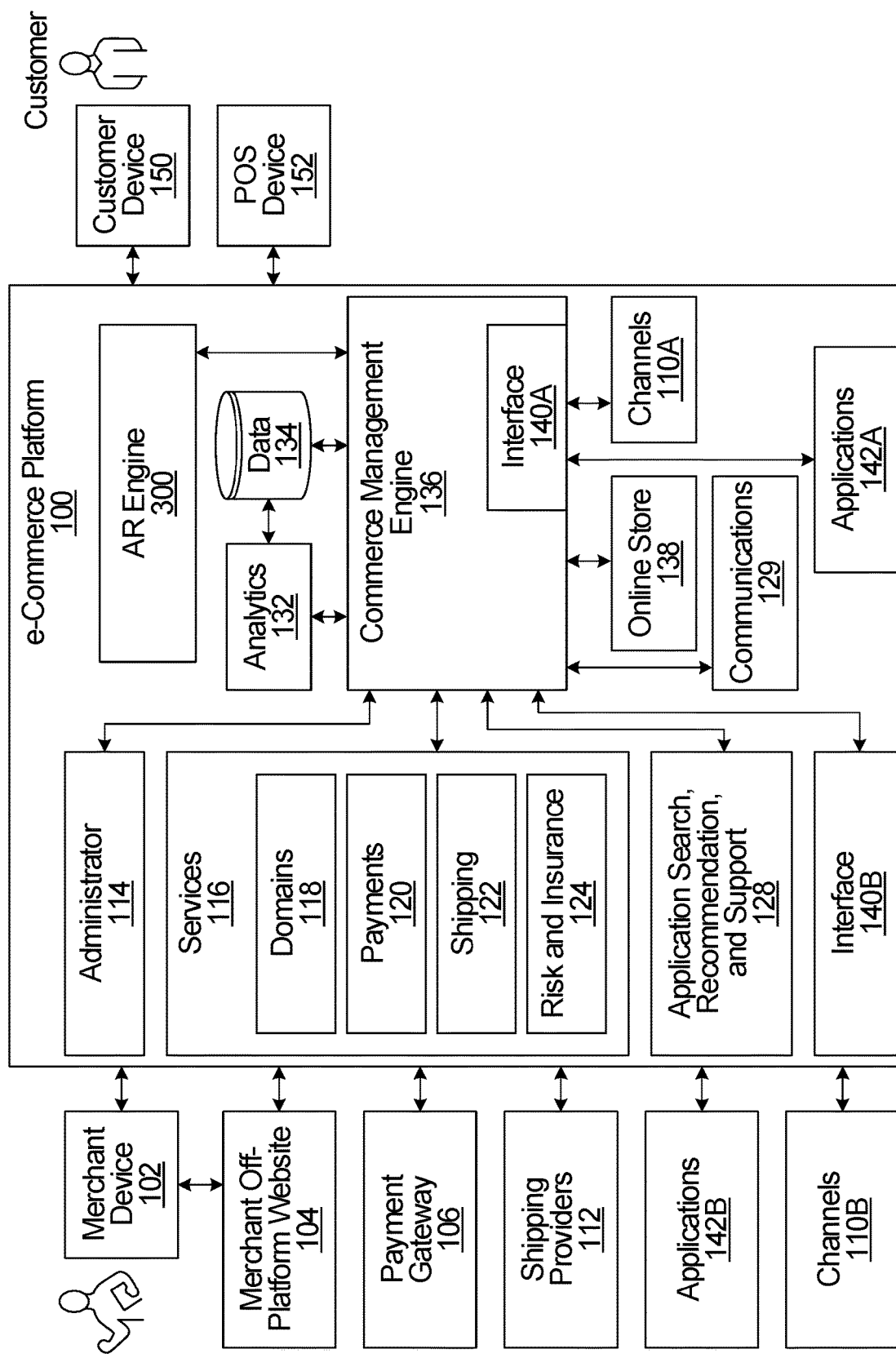
FIG. 3 illustrates the e-commerce platform of FIG. 1, but including an AR engine.

Augmented reality (AR) may be used in commerce to provide improved customer experiences. The e-commerce platform 100 may implement AR for any of a variety of different applications, examples of which are described elsewhere herein. FIG. 3 illustrates the e-commerce platform 100 of FIG. 1, but including an AR engine 300. The AR engine 300 is an example of a computer-implemented system that generates AR content for use by the e-commerce platform 100, the customer device 150 and/or the merchant device 102.

Although the AR engine 300 is illustrated as a distinct component of the e-commerce platform 100 in FIG. 3, this is only an example. An AR engine could also or instead be provided by another component residing within or external to the e-commerce platform 100. In some embodiments, either or both of the applications 142A-B provide an AR engine that is available to customers and/or to merchants. Furthermore, in some embodiments, the commerce management engine 136 provides an AR engine. The e-commerce platform 100 may include multiple AR engines that are provided by one or more parties. The multiple AR engines may be implemented in the same way, in similar ways and/or in distinct ways. In addition, at least a portion of an AR engine may be implemented in the merchant device 102 and/or in the customer device 150. For example, the customer device 150 may store and run an AR engine locally as a software application.

The AR engine 300 may implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 to 3. Further, the embodiments described herein do not necessarily need to be implemented in association with or involve an e-commerce platform at all. In general, any applications of AR could implement the systems and methods disclosed herein.

Applications of AR in Commerce

AR can supplement a user's real-world environment with virtual content to alter the user's perception of the real-world environment. Through a process known as simultaneous localization and mapping (SLAM), a representation of a user's real-world environment and a position of the user within that real-world environment can be continuously or intermittently determined by an AR engine. It should be noted that, as used herein, a position can include both an orientation and a location. An AR experience for the user can then be generated by mapping one or more virtual models to the representation of the real-world environment. AR content for the user may include renders of the virtual models that are overlaid onto the real-world environment. The renders are generated to reflect the relative position of the user in the real-world environment and the mapping of the virtual models to the real-world environment. In this way, the AR content may provide near-seamless integration of the virtual models with the real-world space for the user.

AR can allow a customer to view and interact with a virtual product when the customer is not able to interact with a physical product. For example, AR can superimpose a virtual representation of a product onto a real-world environment that is captured in an image, which can make the product appear to be present in the real-world environment. The image could be of the customer's home or another location that is relevant to the customer, allowing the customer to view the product in an environment that is of interest to them. In some implementations, furniture retailers may use AR to enable customers to view virtual furniture within their homes. For example, a virtual representation of a television can be superimposed on a video stream of a customer's living room using AR, allowing the size and look of the television in the living room to be appreciated.

Conventionally, AR experiences have been limited to a single user and/or to a single user device. Consider the example in which a virtual representation of a television is superimposed on a video stream of a customer's living room. Here, the AR experience is limited to the customer that is capturing the video of the living room. This can limit the functionality of the AR experience in some cases. For example, the customer might want to ask a remote merchant (i.e., a merchant that is not in the same location as the customer) a specific question about the television. Even if the customer is able to speak or otherwise communicate with the merchant while viewing the virtual representation of the television, the customer might still have trouble articulating their questions to the merchant. The merchant cannot see the AR experience that the customer is viewing. Therefore, the merchant does not know what part of the television the customer is referencing and has limited context for the questions being asked by the customer. For example, the customer might have a question about a specific component of the television but may struggle to explain to the merchant which component of the television they are referring to. Similar comments apply to the merchant, who may also be viewing the television (either in the real-world or virtually) but may struggle to articulate their responses to the customer if the customer does not know what component of the television the merchant is referencing.

The limitations of single-user AR experiences extend beyond interactions between customers and merchants. Referring again to the example in which a customer is viewing a virtual representation of a television superimposed over a video stream of their living room, this living room might be shared with another individual. The customer and the other individual could be in two different locations but may want to collaborate when viewing the television. Even if the customer and the other individual are both viewing the television in respective AR experiences and are able to speak with one another, the customer and the other individual might still have difficulty determining what component or aspect of the television the other is viewing. This can hinder communication and collaboration between the customer and the other individual.

Further, challenges can exist even if the customer and the other individual are both viewing the television in respective AR experiences from the same location. In some cases, the customer and the other individual may want to collaboratively shop together for the television while both are located in the same room (e.g., a shared living room). It is difficult to share AR content generated for one user with another user, because AR content is typically generated for one user viewpoint. The viewpoint of a mobile device, set of glasses, or headset is difficult to share with another device even if the other device is in the same room.

Extending an AR experience to multiple users could enable collaboration within the AR experience and improve the overall functionality of the AR experience. However, there are technical challenges to providing AR experiences that can accommodate multiple users simultaneously. For example, when two or more users are accessing an AR experience from different sites, localization and mapping of each user in the AR experience in a manner that enables effective communication can be difficult.

It should be noted that while some embodiments are described in the context of commerce applications, the present disclosure is in no way limited to commerce. The systems and methods disclosed herein can also be implemented in other applications of AR.

Multi-User AR

The present disclosure relates, in part, to systems and methods for generating multi-user AR content. Multi-user AR content can provide a shared AR experience for multiple users that are in different physical positions. Despite the physical separation between the users, AR content relating to the shared AR experience can be generated for each user. The shared AR experience may implement a single virtual coordinate system that includes virtual content such as virtual items, for example. After defining the virtual coordinate system, SLAM processes (for example) can map each user to the virtual coordinate system to generate AR content for the users. Accordingly, in this way, each user may experience the same virtual content through a unique perspective of the shared AR experience.

In some embodiments, the AR content generated for each user in a shared AR experience can include virtual representations of the other users. This may improve the communication between the different users, thereby helping to facilitate cooperation and collaboration within the shared AR experience. For example, the virtual representations of users may allow the multiple users to appreciate each other's view of virtual items in the AR experience, providing context for communication between the users. Each user may be able to view the virtual item in the shared AR experience and see how other users are viewing the virtual item. In commerce applications, this may allow multiple users to view a product and see how other users are viewing the product, for example.

Multi-user AR content for a user in a shared AR experience can further include audio content. This audio content may be obtained from other users in the shared AR experience and include audio recordings of the other users speaking, for example. In some implementations, the audio content includes a directionality corresponding to the position of the user or object that the audio content relates to in the shared AR experience. Directional audio can help a user better determine the relative positions of other users or objects in the shared AR experience. In one example, if a first user is not in view of a second user in the AR experience, directional audio can still provide the second user with an indication of the position of the first user in the AR experience. In another example, if a user can see virtual representations of multiple other users at different positions in the shared AR experience and one of the other users is speaking, directional audio can help the user determine which of the other users is speaking.

In some embodiments, multi-user AR content depicts virtual user interactions. In other words, the virtual interactions of one user within a shared AR experience are conveyed to the other user(s) in the AR experience. Examples of such interactions include a user gesturing towards a virtual item in the AR experience and even touching the virtual item. Displaying virtual interactions in the AR experience can help enable non-verbal communication between the different users.

Figure 4:
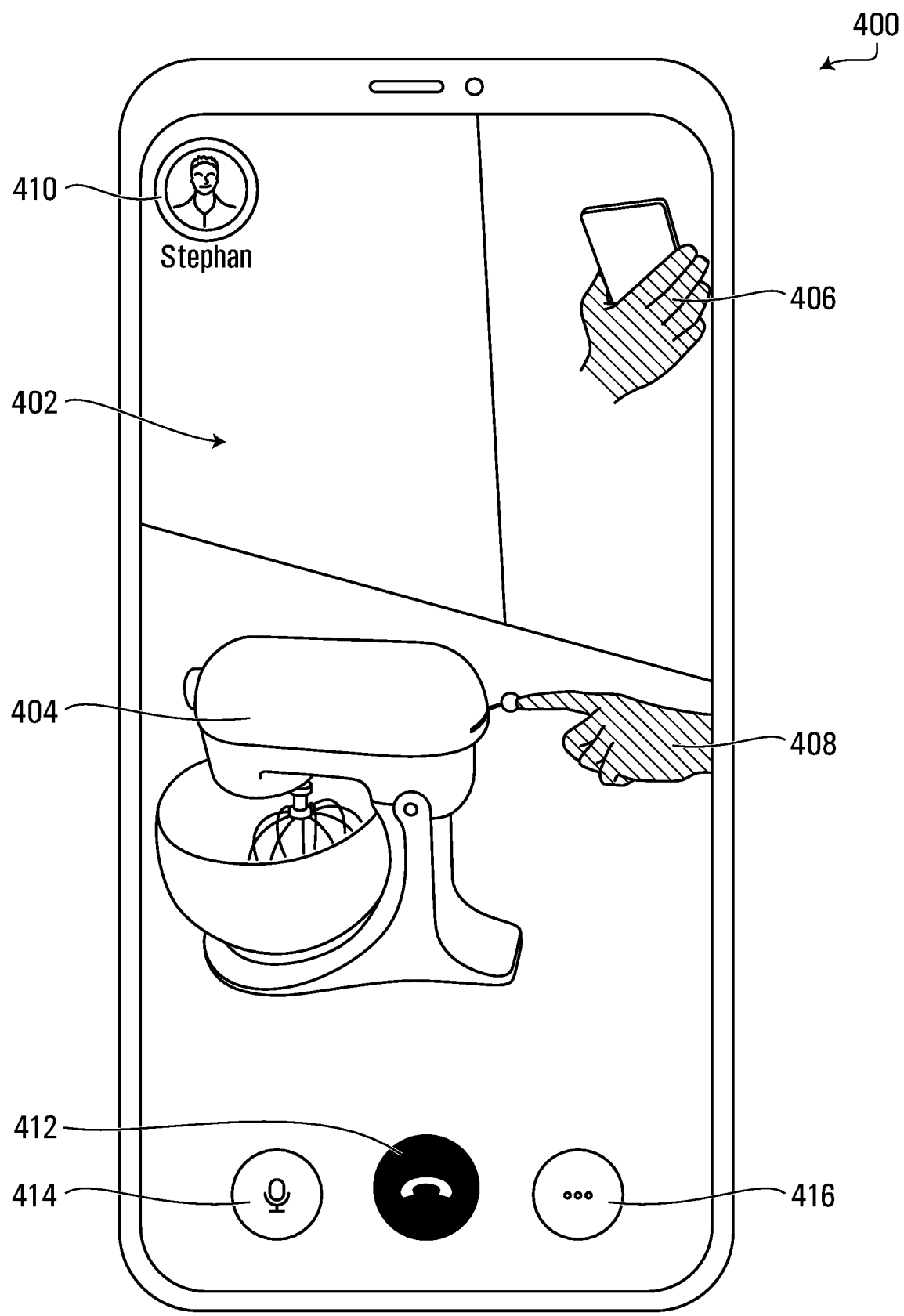
FIG. 4 illustrates a user device displaying AR content for a shared AR experience, according to an embodiment.

FIG. 4 illustrates a user device 400 displaying AR content 402 for a shared AR experience, according to an embodiment. A first user in the shared AR experience is operating the user device 400 and is viewing the AR content 402. The user device 400 may, as shown, also display an indication 410 that a second user is present in the shared AR experience. The second user can be accessing the shared AR experience through a different user device and can be in a different physical location than the first user. The user device 400 may, as shown, further display an option 412 to exit the shared AR experience, an option 414 to mute the microphone of the user device 400 so that the second user cannot hear the first user, and an option 416 to access other functionality.

The AR content 402 includes a virtual representation 404 of a stand-up kitchen mixer, a virtual representation 406 of the second user, and a virtual representation 408 of an interaction between the second user and the mixer. The virtual representation 406 of the second user is in the form of a hand holding a mobile phone and the virtual representation 408 of the interaction is in the form of a hand pointing towards the mixer, but these are only examples.

The virtual representations 404, 406, 408 are examples of visual content; however, the AR content 402 may further include haptic and/or audio content. For example, the AR content 402 could include a recording of the second user's voice so that the first user and second user can speak to one another.

The AR content 402 is overlaid on an image of the first user's kitchen, such that the virtual representation 404 shows the mixer realistically sitting on a counter of the kitchen. In some implementations, the AR content 402 is generated at least in part using a SLAM process. The virtual representation 404 of the mixer may be a render of a three-dimensional (3D) model of the mixer that is defined within a virtual coordinate system of the shared AR experience. The virtual coordinate system is mapped to a representation of the first user's kitchen such that the model of the mixer is positioned on the counter of the kitchen. This representation of the first user's kitchen may have been obtained using a camera or other sensor on the user device 400, for example. After the virtual coordinate system is mapped to the representation of the first user's kitchen, the position of the first user within the kitchen can be determined and mapped to the virtual coordinate system. The render of the model can then be generated based on the relative position of the first user and mixer in the virtual coordinate system.

Using the AR content 402, the first user is able to simultaneously view the mixer through the virtual representation 404, determine how the second user is viewing the mixer based on the virtual representation 406, and determine how the second user is interacting with the mixer through the virtual representation 408. In this way, the virtual representations 404, 406, 408 may improve communication and collaboration between the first user and the second user in the shared AR experience.

AR content can also be generated for the second user in the shared AR experience. This AR content may include a virtual representation of the mixer, a virtual representation of the first user, and/or a virtual representation of the interaction between the second user and the mixer. The AR content for the second user can be overlaid on a representation of a real-world environment surrounding the second user.

In some embodiments, a shared AR experience provides a combination of AR content and other virtual content. For example, in the shared AR experience of FIG. 4, the second user might not be provided with AR content. The second user might instead be provided with VR content including a render of the model of the mixer overlaid on a virtual environment. Alternatively, the second user may simply be viewing the 3D model of the mixer on a device with capabilities to manipulate (for example, rotate and zoom in on) the model.

Embodiments of the present disclosure will now be described in greater detail with reference to FIGS. 5 to 29.

Generating Multi-User AR Content

Figure 5:
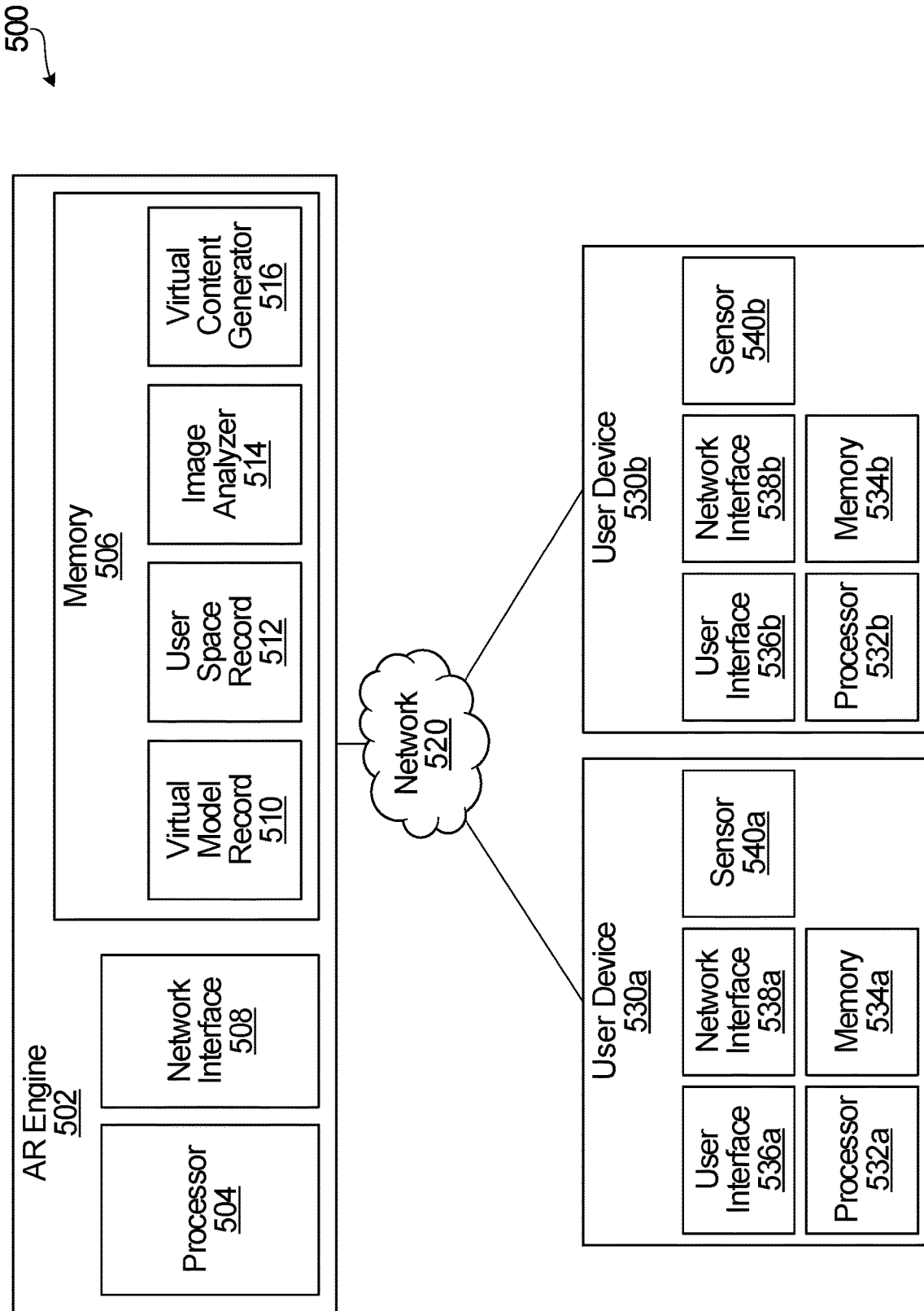
FIG. 5 is a block diagram illustrating a system for providing multi-user AR content for a shared AR experience, according to an embodiment.

FIG. 5 is a block diagram illustrating an example system 500 for providing multi-user AR content for a shared AR experience. The system 500 includes an AR engine 502, a network 520, and multiple user devices 530a, 530b.

The network 520 may be a computer network implementing wired and/or wireless connections between different devices, including the AR engine 502 and the user devices 530a, 530b. The network 520 may implement any communication protocol known in the art. Non-limiting examples of communication protocols include a local area network (LAN), a wireless LAN, an internet protocol (IP) network, and a cellular network.

The AR engine 502 supports the generation of AR content including multi-user AR content. As illustrated, the AR engine 502 includes a processor 504, memory 506 and a network interface 508. The processor 504 may be implemented by one or more processors that execute instructions stored in the memory 506 or in another non-transitory computer readable medium. Alternatively, some or all of the processor 504 may be implemented using dedicated circuitry, such as an application specific integrated circuit (ASIC), a graphics processing unit (GPU) or a programmed field programmable gate array (FPGA).

The network interface 508 is provided for communication over the network 520. The structure of the network interface 508 is implementation specific. For example, the network interface 508 may include a network interface card (NIC), a computer port (e.g., a physical outlet to which a plug or cable connects), and/or a network socket.

The memory 506 stores a virtual model record 510, a user space record 512, an image analyzer 514, and a virtual content generator 516.

The virtual model record 510 stores virtual models of items, buildings, locations, scenery, people, anatomical features, animals and/or any other types of objects. These virtual models can be implemented in an AR experience. By way of example, one or more users may build an AR experience by searching for and selecting virtual models stored in the virtual model record 510. The virtual models can then be implemented within the AR experience for the one or more users, allowing the users to view and optionally interact with the virtual models. The model of the stand-up kitchen mixer in the AR experience of FIG. 4 is an example of a virtual model that could be stored in the virtual model record 510.

Any, one, some or all of the virtual models stored in the virtual model record 510 may be three-dimensional (3D) models. A 3D model is a mathematical representation of an entity that is defined with a length, width and height. A 3D model can be positioned or otherwise defined within a 3D virtual coordinate system, which could be a cartesian coordinate system, a cylindrical coordinate system or a polar coordinate system, for example. A 3D model might be anchored to the origin of the virtual coordinate system such that the 3D model is at the center of the virtual coordinate system. A 3D model may be entirely computer-generated or may be generated based on measurements of a real-world entity. Possible methods for generating 3D models from a real-world entity include photogrammetry (creating a 3D model from a series of 2D images), and 3D scanning (moving a scanner around the object to capture all angles).

A 3D model allows an object to be viewed at various different angles in an AR experience. Further, when a user is viewing AR content using a device with 3D capabilities (such as a headset, for example), the 3D model allows for 3D representations of the object to be generated and included in the AR content. For example, 3D representations of an object might be achieved by displaying slightly different perspectives of the object in each eye of a user, giving the object a 3D effect.

A model stored in the virtual model record 510 can also have associated audio content and/or haptic content. For example, the virtual model record 510 could store sounds made by or otherwise associated with a model and/or haptic feedback that can provide a feel of a model.

The virtual models in the virtual model record 510 could be obtained in any of a number of different ways. In some implementations, at least some of the virtual models are obtained from a user of the AR engine 502, such as from a customer or a merchant, for example. A merchant could generate virtual models for any, one, some or all of the products sold in their stores. These virtual models may be provided directly to the AR engine 502 by the merchant, or the AR engine 502 may obtain the virtual models from a merchant's account on an e-commerce platform and/or from the merchant's online store. Virtual models may also be obtained from other platforms such as social media platforms, for example. In addition, some virtual models may be generated locally at the AR engine 502. For example, images or scans that are obtained by the AR engine 502 can be used to generate a 3D model.

The user space record 512 stores representations of real-world and/or virtual spaces. A representation of a real-world space can define a real-world environment that may be overlaid with virtual content to provide AR content, and a representation of a virtual space can define a computer-generated environment that may be overlaid with virtual content to provide VR content. A representation of a space could be user-specific. For example, a representation of a space could be obtained from and/or generated specifically for a particular user. However, this might not always be the case. A representation of a space could instead be generic or non-personal.

A representation of a space generally provides spatial information pertaining to the features of the space, including the boundaries of the space (for example, the walls of a room) and the objects within the space (for example, the structures and people in a room). The spatial information can identify any, some or all of the features in the space, and provide the position (including the location and orientation) and the dimensions of the features in the space. Non-limiting examples of such features include the surfaces, edges and corners in the space. In other words, the representation of the space may provide a topographical map, layout, or model of the space in 3D.

In some cases, a representation of a real-world space corresponds to a real-world room, building, area or other physical environment. For example, a representation of a real-world space can include, or be generated from, measurements captured by a user device. These measurements may include one or more optical images, radar scans, lidar scans and/or sonar scans of the space, for example. The representation of the real-world space can be continuously or intermittently updated as new measurements are received. In some implementations, a representation of a real-world space can be generated by a SLAM process.

As noted above, a representation of a space stored in the user space record 512 can be computer-generated. An example of a computer-generated representation of a space is a computer-generated 3D model defining the boundaries of a virtual space and any objects within the virtual space.

The image analyzer 514 is provided to analyse images received and/or stored by the AR engine 502. In some implementations, the image analyzer 514 is used to generate a representation of a real-world space based on one or more images of the real-world space. Image analysis can detect the features of the real-world space, including the surfaces, edges and/or corners of the real-world space. Image analysis can also determine the dimensions and relative positions of these features of the real-world space in 3D. The representation of the real-world space can then be generated based on the size, shape and position of the features, and optionally be stored in the user space record 512.

In further implementations, the image analyzer 514 is used to generate virtual models of objects through photogrammetry, for example. These virtual models can be stored in the virtual model record 510.

More than one image could be input into the image analyzer 514 at a time. For example, multiple images of a real-world space taken from different positions could allow for the determination of a broader and more accurate representation of the real-world space. The multiple images could be obtained from a video stream or from multiple different cameras, for example. In cases where the image analyzer 514 receives a video stream for a real-world space, the image analyzer 514 could perform an initial feature detection operation to locate the features of the real-world space. These features could then be tracked in subsequent images received from the video stream in real-time. New features that are detected in the subsequent images could be added to the representation of the real-world space to expand the representation of the real-world space.

The image analyzer 514 may be implemented in the form of software instructions that are executable by the processor 504. Any of a number of different algorithms could be included in the image analyzer 514. Non-limiting examples of such algorithms include:

- Surface, corner and/or edge detection algorithms;
- Object recognition algorithms;
- Motion detection algorithms; and
- Image segmentation algorithms.

Further details regarding image analysis algorithms can be found in *Computer Vision: Algorithms and Applications* by Richard Szeliski, ISBN: 978-1-84882-935-0 (Springer, 2010), the contents of which are herein incorporated by reference in their entirety.

The virtual content generator 516 employs and/or implements one or more algorithms (possibly in the form of software instructions executable by the processor 504) that are capable of generating virtual content for one or more users. This virtual content could form the basis of AR content that is generated for a user in a shared AR experience. Non-limiting examples of virtual content include:

- virtual representations of one or more objects, such as the virtual representation 404 of the stand-up kitchen mixer in FIG. 4;
- virtual representations of one or more users, such as the virtual representation 406 of the second user in FIG. 4; and
- virtual representations of one or more user interactions, such as the virtual representation 408 of the interaction between the second user and the mixer in FIG. 4.

To generate virtual content for a particular user, possible inputs to the virtual content generator 516 include:

- One or more virtual models defined within a virtual coordinate system. The virtual models may be obtained from the virtual model record 510, for example.
- A representation of a real-world or virtual space associated with a user. The representation of the space may be obtained from the user space record 512, for example.
- An anchor point for the virtual coordinate system within the representation of the space to map the virtual coordinate system to the space. The anchor point may be received from a user device, for example.
- A location of the user within the virtual coordinate system, determined by an AR engine, for example.
- A location of one or more other users within the virtual coordinate system, determined by an AR engine, for example.
- A location of one or more user interactions within the virtual coordinate system, determined by an AR engine, for example.

The virtual content output by the virtual content generator 516 can include visual, haptic and/or audio content. Visual content can allow a user to view virtual objects within an AR experience, haptic content can allow a user to touch and feel virtual objects within the AR experience, and audio content can allow a user to hear sounds within the AR experience. In some implementations, visual, haptic and/or audio content is generated based on the position (including a location and orientation) of one or more users within a virtual coordinate system of the AR experience. For example, visual content for a user can depict an object based on the relative position of the user to a model of the object in the virtual coordinate system. Haptic content can provide the sensation of touching or feeling an object based on the one or more anatomical features of the user that are abutting the object in the virtual coordinate system. Haptic content might be implemented, at least in part, using clothing with built-in haptics, for example. Audio content can implement spatial audio with a directionality corresponding to the position of the user relative to a source of the audio content within the virtual coordinate system. In some implementations, spatial audio is produced by independently controlling the sounds played into each ear of a user.

Consider an example of virtual content that is generated for a particular user in an AR experience. The virtual content could include visual content depicting an object in the AR experience, haptic content providing a feel of the object, and audio content providing a sound made by the object. The size and position of the object depicted in the visual content may correspond to the position of a user relative to the object in a virtual coordinate system of the AR experience. Similarly, the directionality of the audio content may correspond to the position of the user relative to the object in the virtual coordinate system. If the object is to the left of the user, then audio content for the object might be louder in the left ear of the user. The haptic content might be based on which part of the user is touching the object (for example, if the user is touching the object with their finger or their palm) and which part of the object the user is touching in the virtual coordinate system.

Virtual content can be continuously or intermittently updated by the virtual content generator 516 to reflect changes and/or modifications in an AR experience. If a user moves within a virtual coordinate system of the AR experience, then new virtual content can be generated to reflect the new position of the user within the virtual coordinate system. For example, when the user moves relative to a virtual model in the virtual coordinate system, then the size and orientation of a render of the model can change accordingly. Similar comments apply to audio content and haptic content included in the virtual content for the user, which can also change when the user moves.

In some implementations, the virtual content generated for a user by the virtual content generator 516 is AR content. The AR content is overlaid onto a real-world space surrounding the user, providing the user with an AR experience. This can include overlaying the AR content on an image of the real-world space captured by a camera, for example. Alternatively, the AR content can be overlaid onto the real-world space using a transparent display in an AR headset, for example. The AR content can be generated based on a representation of the real-world space that is stored in the user space record 512.

In some implementations, the virtual content provided for a user by the virtual content generator 516 is VR content. The VR content includes one or more virtual representations of objects, users and/or user interactions that are overlaid on a representation of a virtual space. Accordingly, the VR content can be entirely computer-generated. The representation of the virtual space could be obtained from the user space record 512, for example.

In some implementations, the virtual content generator 516 provides a shared AR experience for multiple users. The virtual content generated for each of the multiple users can be based on a single virtual coordinate system that defines one or more virtual models of objects, users and/or user interactions. Each user in the shared AR experience can have a position (including a location and orientation) within the virtual coordinate system, and the virtual content generated for each user may depend on their position.

It should be noted that AR content might not always be generated for all users in a shared AR experience. In some implementations, a shared AR experience provides a combination of AR content and VR content. By way of example, when a customer is interacting with a merchant in a shared AR experience, the customer may receive AR content that is overlaid on their real-world surroundings, while the merchant may receive VR content that is entirely computer-generated. The customer and the merchant may both be viewing a model of a product sold by the merchant in the shared AR experience. The customer may wish to see how the product will look in their house, and therefore chooses AR content to be overlaid on their real-world surroundings. On the other hand, the merchant might only be in the shared AR experience to assist the customer and might not care what environment they view the product in. Therefore, the merchant can choose VR content. Alternatively, the virtual content for the merchant might not be overlaid on an environment at all. The merchant may simply be viewing one or more 3D models in an otherwise empty space. Both the AR content and the VR content may include representations of the merchant/customer, allowing for a collaborative AR experience.

Although the image analyzer 514 and the virtual content generator 516 are illustrated as separate models, this is only an example. Some embodiments could combine the functionality of the image analyzer 514 and the virtual content generator 516 in a single software instance stored in the memory 506 or in another non-transitory computer readable medium.

Virtual content, including AR content and VR content, that is generated by the AR engine 502 can be output to either or both of the user devices 530*a*, 530*b*. As such, the user devices 530*a*, 530*b* can enable respective users to engage with a shared AR experience. Non-limiting examples of a user device include a mobile phone, tablet, laptop, projector, headset and computer. A user device may be a customer device that is owned and/or operated by a customer or be a merchant device that is owned and/or operated by a merchant, for example. In some implementations, either or both of the user devices 530*a*, 530*b* include implanted devices or wearable devices, such as a device embedded in clothing material or a device that is worn by a user such as glasses, with built-in displays allowing a user to view the real-world and simultaneously view virtual content that is overlaid on the real-world.

The user device 530*a* includes a processor 532*a*, memory 534*a*, user interface 536*a*, network interface 538*a* and sensor 540*a*. Similarly, the user device 530*b* includes a processor 532*b*, memory 534*b*, user interface 536*b*, network interface 538*b* and sensor 540*b*. The user device 530*a* will be described by way of example below. However, it should be noted the description of the user device 530*a* can also apply to the user device 530*b*.

The user interface 536*a* can include, for example, a display screen (which may be a touch screen), a gesture recognition system, a speaker, headphones, a microphone, haptics, a keyboard, and/or a mouse. The user interface 536*a* may be at least partially implemented by wearable devices embedded in clothing and/or accessories, for example. The user interface 536*a* can present virtual content to a user, including visual, haptic and audio content. The network interface 538*a* is provided for communicating over the network 520. The structure of the network interface 538*a* will depend on how the user device 530*a* interfaces with the network 520. For example, if the user device 530*a* is a mobile phone, headset or tablet, then the network interface 538*a* may include a transmitter/receiver with an antenna to send and receive wireless transmissions to/from the network 520. If the user device is a personal computer connected to the network with a network cable, then the network interface 538*a* may include, for example, a NIC, a computer port, and/or a network socket. The processor 532*a* directly performs or instructs all of the operations performed by the user device 530*a*. Examples of these operations include processing user inputs received from the user interface 536*a*, preparing information for transmission over the network 520, processing data received over the network 520, and instructing a display screen to display information. The processor 532*a* may be implemented by one or more processors that execute instructions stored in the memory 534*a*. Alternatively, some or all of the processor 532*a* may be implemented using dedicated circuitry, such as an ASIC, a GPU, or a programmed FPGA.

The sensor 540*a* is provided to obtain measurements of the real-world environment surrounding the user device 530*a*. These measurements can be used to generate representations of real-world spaces and/or 3D models of objects, for example. The representations of the real-world spaces may be stored in the user space record 512 and the 3D models of objects may be stored in the virtual model record 510.

The sensor 540*a* may include one or more cameras, radar sensors, lidar sensors and sonar sensors, for example. In the case of a camera, the captured images may be processed by the image analyzer 514. Measurements obtained from radar sensors, lidar sensors and sonar sensors can also be processed by the AR engine 502. Although the sensor 540*a* is shown as a component of the user device 530*a*, the sensor 540*a* may also or instead be implemented separately from the user device 530*a* and may communicate with the user device 530*a* and/or the AR engine 502 via wired and/or wireless connections, for example.

In some implementations, the user device 530*a* has AR capabilities. For example, an AR engine similar to the AR engine 502 could be implemented in part or in whole on the user device 530*a*. A software application or instance may be installed on the user device 530*a* that generates virtual content locally (i.e., on the user device 530*a*). The software application could receive the virtual model record 510, the user space record 512, the image analyzer 514 and/or the virtual content generator 516 from the AR engine 502.

In FIG. 5, two user devices are shown by way of example. More than two user devices may be in communication with the AR engine 502.

The AR engine 502 is provided by way of example. Other implementations of an AR engine are also contemplated. In some implementations, an AR engine is provided at least in part by an e-commerce platform, either as a core function of the e-commerce platform or as an application or service supported by or communicating with the e-commerce platform. In some implementations, an AR engine is implemented at least in part by a user device, such as a customer device or a merchant device. In some implementations, an AR engine is implemented as a stand-alone service to generate AR content. While the AR engine 502 is shown as a single component, an AR engine could instead be provided by multiple different components that are in communication via a network.

Generating Multi-User AR Content with Virtual Representations of Users

Figure 6:
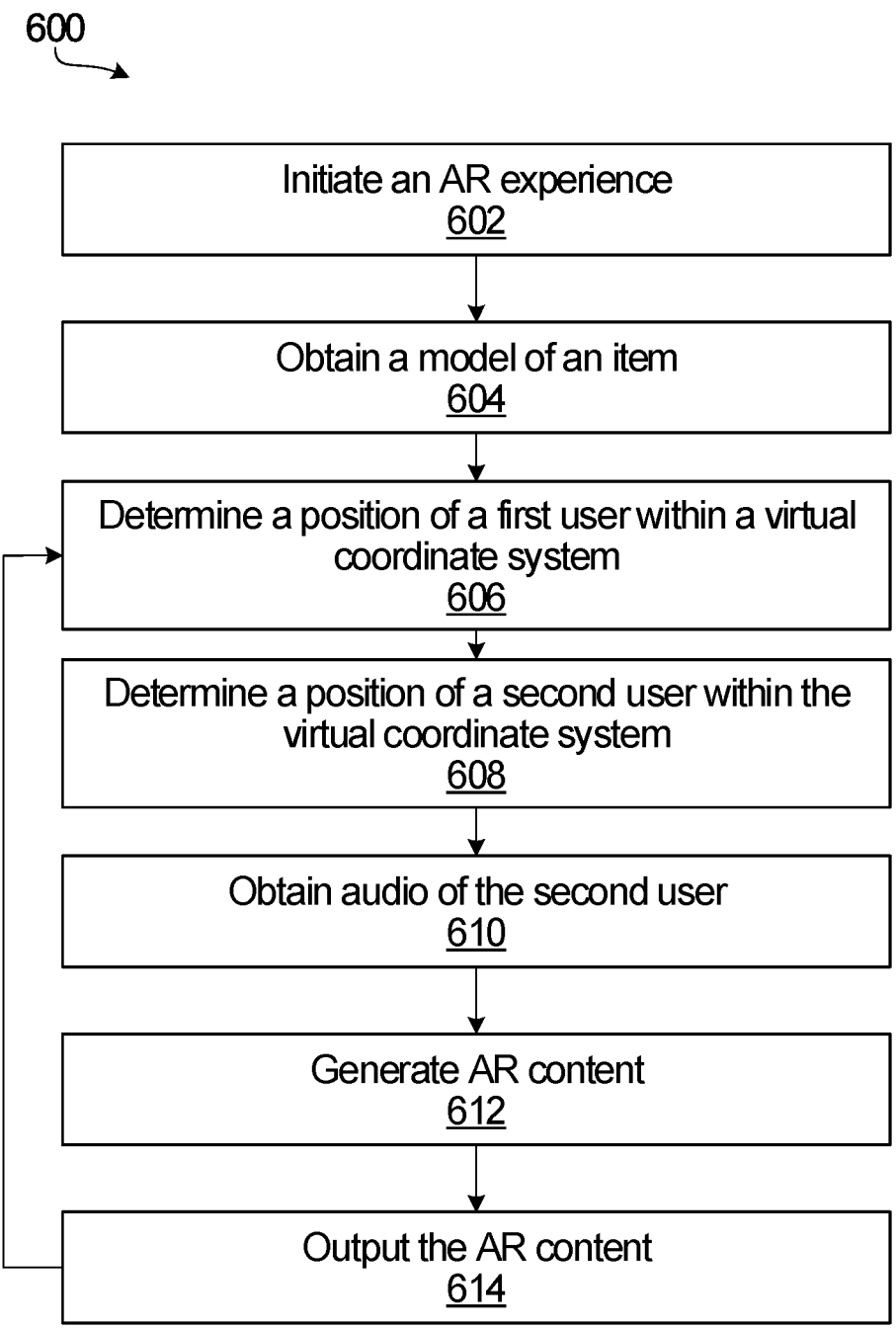
FIG. 6 is a flow diagram illustrating a method of generating AR content for a shared AR experience, according to an embodiment.

FIG. 6 is a flow diagram illustrating a method 600 of generating AR content for a shared AR experience, according to an embodiment. The method 600 will be described as being performed by the AR engine 502 of FIG. 5, with the shared AR experience including at least the user of the user device 530*a* (who will be referred to as the "first user") and the user of the user device 530*b* (who will be referred to as the "second user"). However, at least a portion of the method 600 could instead be performed elsewhere, such as at the user device 530*a* and/or the user device 530*b*, for example.

Step 602 is an optional step that includes the processor 504 initiating the shared AR experience based on instructions received from either or both of the user devices 530*a*, 530*b*. The shared AR experience could be initiated in any of a number of different ways. In one example, a first user could initiate a personal AR experience on the user device 530*a*. The first user could then invite the second user into the AR experience, creating a shared AR experience. In another example, the AR experience could be initiated for the first user and the second user at the same time. As such, the AR experience is initiated as a multi-user AR experience.

Step 604 includes the processor 504 obtaining a model of an item for the shared AR experience. This model can be a 3D model. In some implementations, the model of the item is obtained from the virtual model record 510. The first user and/or the second user may select the model from the virtual model record 510 based on a specific item that the first user and/or the second user wishes to view in the shared AR experience. For example, if the first user wishes to view a particular product sold by a merchant, then step 604 may include the first user searching for this product in the virtual model record 510 and selecting a model of the product. In other implementations, the model of the item may be obtained directly from one of the user devices 530*a*, 530*b*.

The model of the item obtained in step 604 may be positioned or otherwise defined within a virtual coordinate system. The model might be anchored to the origin of the virtual coordinate system, such that model is at the center of the virtual coordinate system. The dimensions of the item may be defined by the model, allowing the item to be properly scaled within the virtual coordinate system to reflect the item's physical size.

In some implementations, multiple models of items could be obtained in step 604 and included in the shared AR experience. These multiple models may be obtained at once or at different times, and may be selected by the first user, the second user, or both.

Step 606 includes the processor 504 determining a position of the first user within the virtual coordinate system. It should be noted that the position of the first user in the virtual coordinate system can include a coordinate of the first user in the virtual coordinate system as well as an orientation of the first user in the virtual coordinate system. Following step 606, the model of the item and the first user will have respective positions defined within the virtual coordinate system, allowing the position of the model relative to the first user to be determined.

In some implementations, the position of the first user is determined based on first information obtained by the user device 530*a*. The first information may be transmitted to the AR engine 502 by the user device 530*a* via the network 520. The form of the first information is not limited herein. In some implementations, the first information includes or provides a representation of a space associated with the first user. This space provides a setting or environment in which the first user can view the model of the item. The virtual coordinate system can then be mapped to the representation of the space to determine the position of the first user within the virtual coordinate system.

In some cases, the space associated with the first user is a 3D, real-world space where the first user is physically present. For example, the real-world space may be a room of the first user's house. The first information may include measurements of the real-world space that are collected by the user device 530a. The representation of the real-world space can then be generated from these measurements. If the measurements include optical images, then the image analyzer 514 may help process the images to generate the representation of the real-world space. Other examples of the measurements include radar scans, lidar scans and sonar scans of the real-world space. The representation of the real-world space may be stored in the user space record 512.

In other cases, the first information might include a selection of a previously generated representation of a space from the user space record 512. This space may correspond to a location that is specific to the first user (such as a room of the first user's house, for example) and may be based on measurements that were previously obtained from the first user.

A position of the first user (including a location and orientation) in the space can be determined in step 606, possibly based on the first information obtained by the user device 530a. For example, the first information may include an indication of the position of the first user within the space. In some cases, the position of the first user is considered to be equivalent to the position of the user device 530a. Examples of such cases include when the user device 530a is a smart phone or headset that is held, attached to and/or operated by the first user. In these cases, step 606 can include determining the position of the user device 530a in the space, and the position of the first user is inferred from the position of the user device 530a.

If the representation of the space is determined based on measurements obtained by the user device 530a, then the position of the first user may also be determined from the measurements. For example, analysis of the measurements may allow determination of the distance from the first user or the user device 530a to one or more surfaces in the space. Lidar and radar have ranging capabilities to determine distances to surfaces. Further, image analysis performed by the image analyzer 514 may, additionally or alternatively, be used to determine the distances to surfaces from optical images. When the distance from the first user or the user device 530a to one or more surfaces within the space is known, then the position of the first user and/or user device 530a within the space can be determined through triangulation or other means. Global positioning system (GPS) data may also or instead be used to determine the position of the user device 530a within the space. In some cases, the process of generating a representation of a real-world space and determining the first user's position within the real-world space can be performed using a SLAM process.

An explicit indication of the position of the first user within the space can also or instead be provided by the first information. For example, the coordinates of the first user and/or the user device 530a within the space could be directly provided to the AR engine 502.

When the first information provides a representation of a space, step 606 can include mapping the virtual coordinate system to the representation of the space. This may involve obtaining a position (including a location and orientation) of the model obtained in step 604 within the space. In some cases, the first information includes a selection or indication of a desired position of the model within the space. For example, the first user may use the user device 530a to indicate that they would like to position the model of the item at a certain location and orientation within the space. This position of the model may be used as an anchor point to map the virtual coordinate system to the space. The virtual coordinate system and the model can then be fixed relative to the space.

At step 606, after obtaining the representation of the space, determining the position of the first user within the space and mapping of the virtual coordinate system to the space, the position of the first user within the virtual coordinate system may be determined.

Step 608 includes the processor 504 determining a position of the second user within the virtual coordinate system. The position of the second user in the virtual coordinate system can include a coordinate of the second user in the virtual coordinate system as well as an orientation of the second user in the virtual coordinate system. Following step 608, the first user, the second user and the model of the item will have respective positions defined within the virtual coordinate system. This can enable the position of the first user relative to the second user and relative to the model to be determined.

The position of the second user in the virtual coordinate system may be determined using methods similar to those described above in relation to step 606 and the determination of the position of the first user in the virtual coordinate system. In some implementations, the position of the second user in the virtual coordinate system may be determined based on second information obtained by the user device 530b and transmitted to the AR engine 502 via the network 520. The second information may include a representation of a space associated with the second user. In some cases, the space associated with the second user is a real-world space that is different from a real-world space associated with the first user. For example, respective real-world spaces associated with the first user and the second user could be physically separate from each other. Accordingly, the first user and second user might be in different rooms, buildings, cities or even countries.

In some implementations, the representation of the space for the second user is a computer-generated representation of a virtual space. The virtual space could represent a space that is associated with the second user, but this might not always be the case. The virtual space could instead be a non-personal or generic space. For example, a generic room might be depicted in a computer-generated representation of a virtual space.

Step 608 can include determining the position of the second user within the virtual coordinate system based on the position of the second user within their associated space. The position of the second user within their space can be determined using measurements or an explicit indication received from the user device 530b, for example. In some implementations, the processor 504 obtains a position of the model of the item within the space associated with the second user from the user device 530b. The processor 504 may then map the virtual coordinate system to the space of the second user based on the position of the model within the space. This mapping can allow the position of the second user within the virtual coordinate system to be determined.

Following steps 604, 606, 608, respective positions of the first user, the second user and the model of the item in the single virtual coordinate system have been obtained. The virtual coordinate system may have been mapped to different spaces associated with the first user and the second user. As such, the first user and the second user can interact with the model of the item in environments of their choosing.

In step 610, the processor 504 obtains audio of the second user. For example, the voice of the second user could be recorded by a microphone in the user device 530b and be transmitted to the AR engine 502. Other information regarding the second user could also be collected in step 610, such as an image of the second user. For example, the user device 530b may be a mobile device that has a rear-facing camera to capture images of the real-world space surrounding the second user, and a front-facing camera to capture an image of the second user's face.

Step 612 includes the processor 504 generating AR content for the first user. The AR content may include, inter alia, a render of the model obtained in step 604, a virtual representation of the second user, audio content, and/or haptic content. In some implementations, the AR content is generated using the virtual content generator 516.

The render of the model of the item is generated based on the position of the first user within the virtual coordinate system. For example, the orientation of the model depicted in the render can correspond to the first user's viewpoint of the model in the virtual coordinate system. Further, the size of the render can correspond to the first user's distance from the model in the virtual coordinate system. For example, as the first user moves further away from the model in the virtual coordinate system, then the size of the model in the AR content for the first user can decrease.

The virtual representation of the second user may be based on the position of the first user and on the position of the second user in the virtual coordinate system. For example, the position of the second user relative to the position of the first user in the virtual coordinate system can determine the distance between the first user and the second user and the orientation of the second user relative to the first user. This distance and orientation can then be used to generate the representation of the second user. The distance between the first user and the second user in the virtual coordinate system can be reflected in the size of the virtual representation of the second user. The virtual representation of the second user may also include an indication of the orientation of the second user in the virtual coordinate system.

The representation of the second user and the render of the model in the AR content generated in step 612 may reflect the position of the second user relative to the model in the virtual coordinate system. Accordingly, the first user's AR content may convey the second user's perspective of the item depicted by the model.

In some implementations, the representation of the second user is generated using a model depicting or representing the second user. This model may be obtained from the virtual model record 510 and mapped to the virtual coordinate system at the position of the second user. A render of the model of the second user may be used as the representation of the second user. The model of the second user may be considered a virtual avatar of the second user.

The form of the representation of the second user is not limited herein. The representation of the second user may depict the second user's entire body, a part of the second user's body (for example, the user's face), and/or some object associated with the second user. However, the representation of the second user might not depict the second user at all. Instead, the representation of the second user could be a symbol or object that represents the second user. In some cases, the representation of the second user includes a virtual user device. In at least some of these cases, the position of the second user determined in step 608 might correspond to the position of the user device 530b. An example of a virtual user device is the virtual representation 406 of FIG. 4.

In some implementations, the virtual representation of the second user may include at least a portion of an image of the second user that is obtained in step 610. This image may be an image of the second user's face, which can be incorporated into the representation of the second user in the AR content for the first user. As such, the first user can view the real-time facial expressions of the second user, thereby providing a more immersive multi-user AR experience. In some cases, a 3D model of the second user's face may be generated based on multiple images captured by the user device 530b. This 3D model could be used to generate different views of the second user's face to reflect the orientation of the second user relative to the first user in the virtual coordinate system.

The audio content in the AR content for the first user may include or be based on the audio of the second user obtained in step 610. In this way, the first user may be able to listen to the second user in the shared AR experience, enabling verbal communication between the users. Other audio content, such as sounds associated with the model of the item, may, additionally or alternatively, be included in the AR content.

In some implementations, the audio content may be spatialized based on the position of the first user and the position of the user or object making the sound in the audio content. Spatialized audio has a directionality that can be conveyed by multiple speakers in the user device 530a. By way of example, audio content that is based on an audio recording of the second user obtained in step 610 can include a directionality corresponding to the position of the second user relative to the position of the first user within the virtual coordinate system. If the position of the second user is to the left of the first user in the virtual coordinate system, then the audio recording of the second user might only be played in a left speaker of the user device 530a. This can allow the first user to appreciate the relative position of the second user based on the audio content, providing a more immersive AR experience.

Haptic content included in the AR content generated at step 612 can allow the first user to virtually touch and feel other objects in the shared AR experience, including the model of the item and the second user, for example.

In step 614, the AR content is output by the processor 504 for presentation at the user device 530a. This can include transmitting at least some of the AR content to the user device 530a via the network 520. Visual content in the AR content can be displayed on a screen of the user device 530a and audio content in the AR content can be played on a speaker of the user device 530a, for example.

In some implementations, the AR content includes at least a portion of a representation of a real-world space for the first user. For example, during presentation at the user device 530a, at least some of the AR content (including the render of the model and the virtual representation of the second user, for example) can be overlaid on an image of the real-world space obtained in step 606. As such, the AR content can be superimposed over the real-world surroundings of the first user.

Overlaying the AR content on an image of the real-world space can be performed at the AR engine 502 or at the user device 530a. By way of example, the render of the model and the virtual representation of the second user could be generated at the AR engine 502 and then transmitted to the user device 530a, where the render of the model and the virtual representation of the second user are overlaid on an image captured by the user device 530a. Alternatively, the AR content might not include a representation of the real-world space for the first user. The AR content might instead be presented on a transparent display in the user device 530a, allowing the first user to view the AR content and the real-world simultaneously.

As illustrated by the feedback arrow from step 614 to step 606 in FIG. 6, steps 606, 608, 610, 612, 614 can be repeated multiple times. This can allow the first user to navigate within the shared AR experience and receive new AR content in response, for example. At each instance of step 614, updated AR content for the first user is output to the user device 530a, which can include updated renders of the model of the item, updated representations of the second user, new audio content, and/or new haptic content.

In the case that the first user's position within the virtual coordinate system is determined based on the first user's position within a real-world space, navigation within the AR experience can include the first user physically moving themselves or their user device 530a within the real-world space. Based on measurements from the user device 530a, an updated position of the first user in the real-world space can be determined at each instance of step 606, which can be mapped to the virtual coordinate system that remains fixed in the real-world space. An updated position of the second user in the virtual coordinate system can also be determined at each instance of step 608. Updated AR content for the first user can then be generated at step 612 based on the updated positions of the first user and the second user. As the user device 530a captures more measurements of the real-world space through the iterations of step 606, the representation of the real-world space can also be updated. This can add new features and/or areas to the representation of the real-world space. However, the position of the model of the item in the virtual coordinate system can remain fixed over time and therefore may only need to be defined once in the method 600.

It should be noted that the order of steps 602, 604, 606, 608, 610, 612, 614 in FIG. 6 are shown by way of example only. Different orders of steps 602, 604, 606, 608, 610, 612, 614 are also contemplated. For example, step 608 could be performed before step 606. Additionally or alternatively, two or more of steps 602, 604, 606, 608, 610, 612, 614 could be performed simultaneously.

Although the method 600 relates to the generation of AR content for the first user, virtual content can also be generated for the second user by the AR engine 502. Further users may also be present in the shared AR experience and receive associated virtual content generated by the AR engine 502. The virtual content for the second user may be AR content or VR content that is generated using the virtual content generator 516, for example. The virtual content could then be output for presentation at the user device 530b. The virtual content may include any one or more of:
  a render of the model based on the position of the second user within the virtual coordinate system;
  a representation of the first user based on the position of the first user and on the position of the second user within the virtual coordinate system;
  audio content; and
  haptic content.

In the case that AR content is generated for the second user, steps similar to steps 610, 612, 614 could be implemented to generate the AR content. Alternatively, other virtual content could be generated for the second user by adding a render of the model and/or a representation of the first user to a virtual space, for example. The virtual space may be obtained from the user space record 512. The second user could navigate within the shared AR experience using the user interface 536b. For example, the user interface 536b could include buttons to move the second user's position within the virtual coordinate system.

Figure 7:
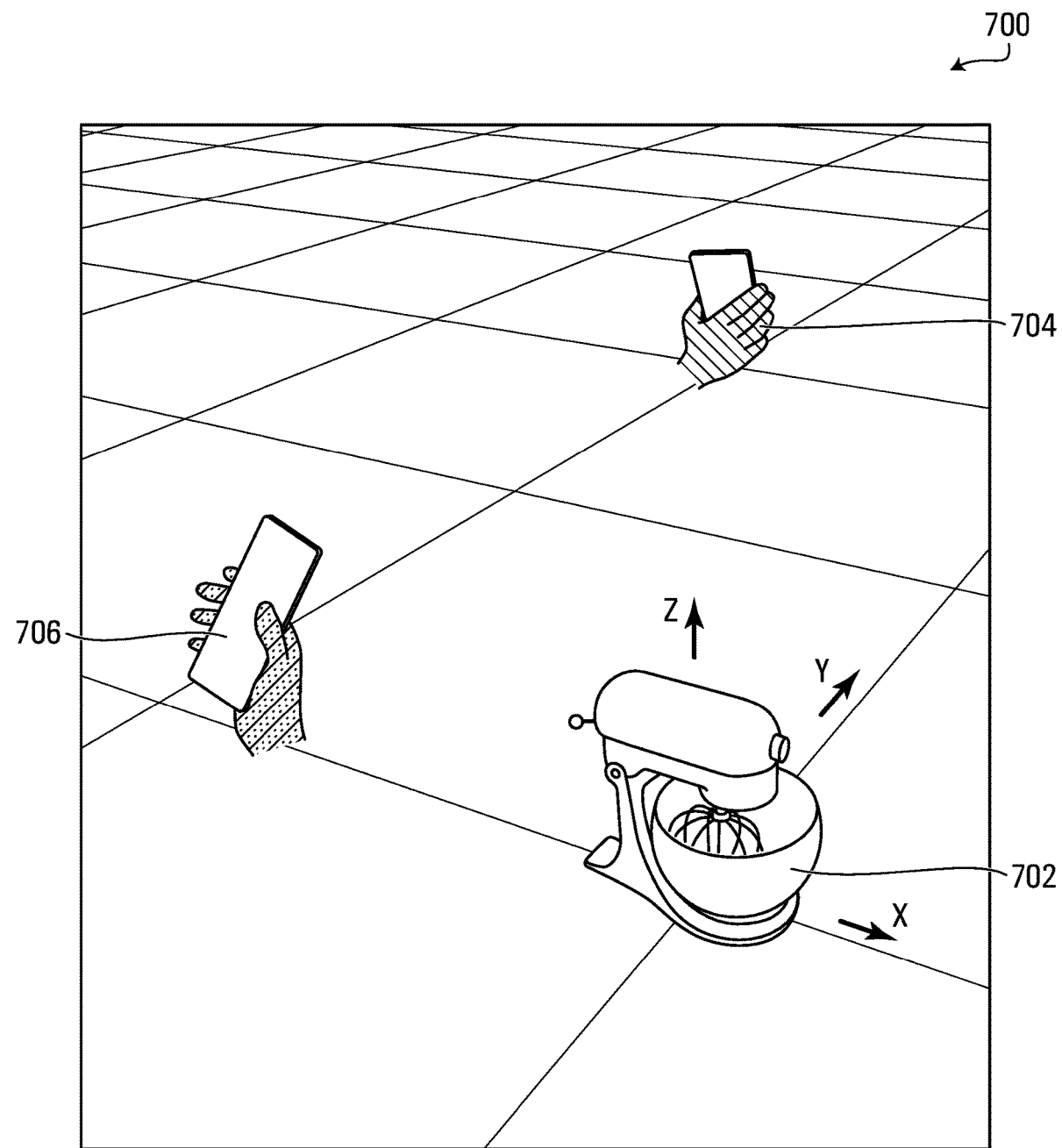
FIG. 7 is a perspective view of a virtual coordinate system for a shared AR experience, including a customer, a merchant and a model of a mixer, at a first instance in time, according to an embodiment.
Figure 8:
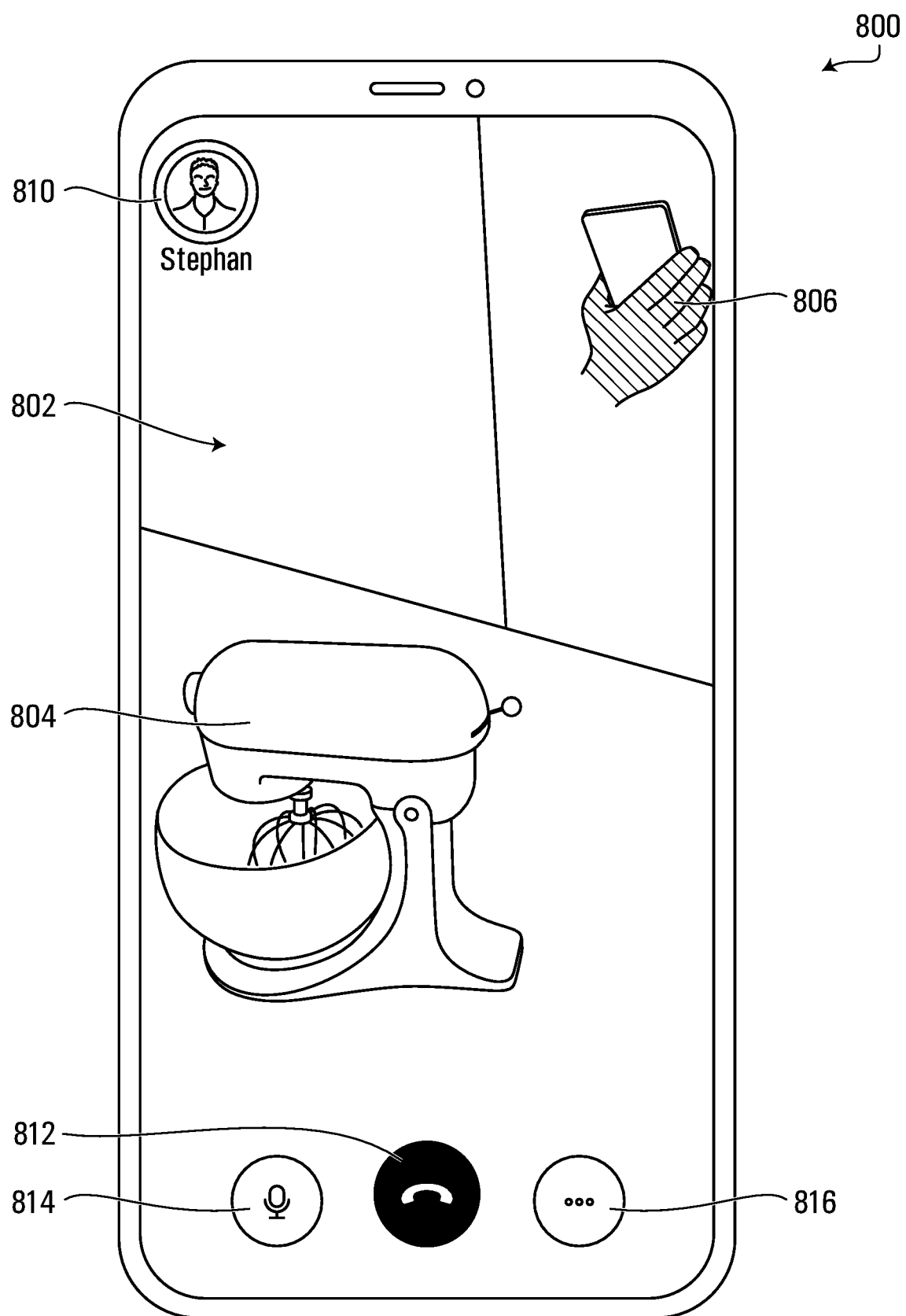
FIG. 8 illustrates a customer device displaying AR content for the shared AR experience of FIG. 7 at the first instance in time.
Figure 9:
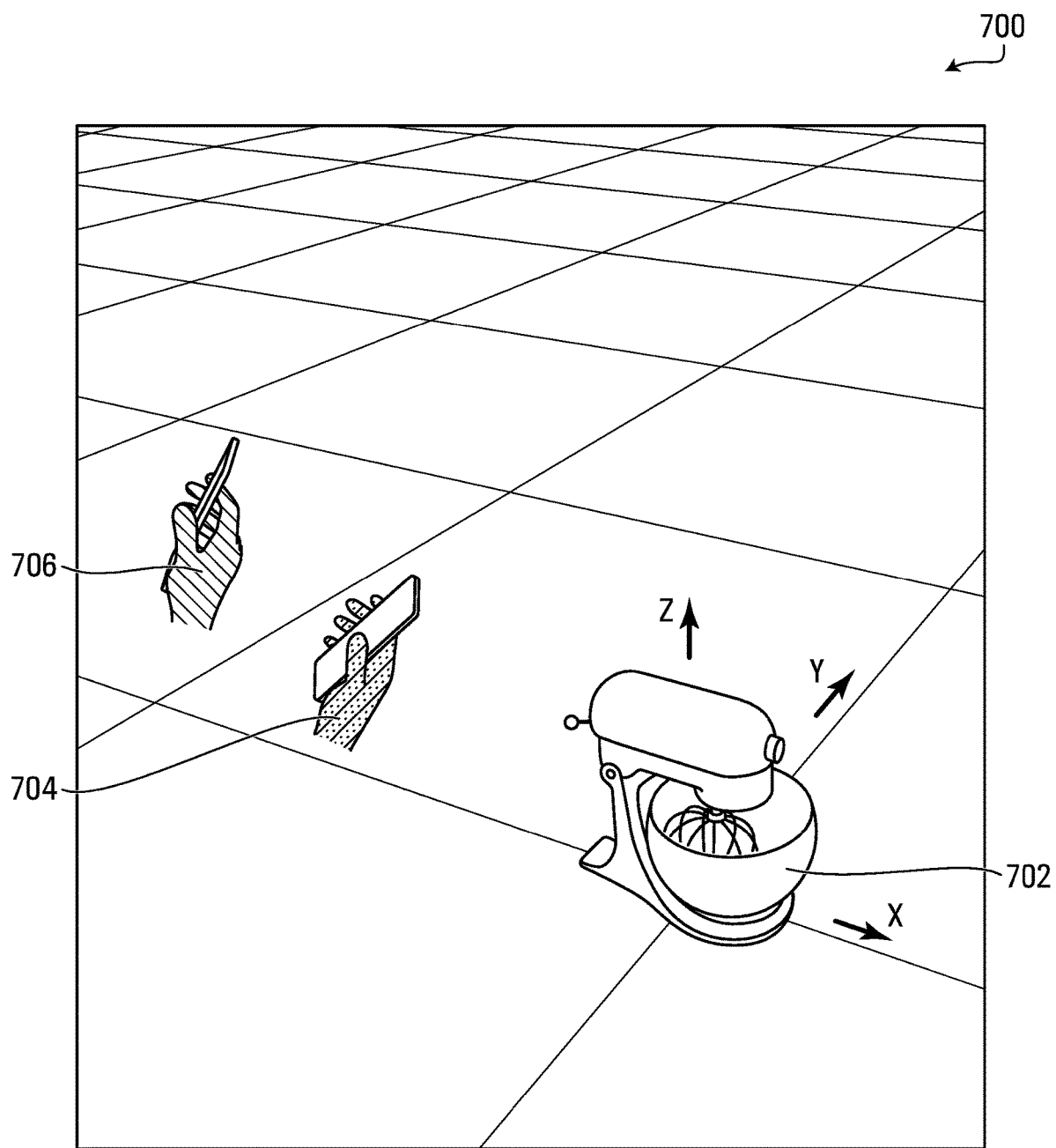
FIG. 9 is a perspective view of the virtual coordinate system for the shared AR experience of FIG. 7 at a second instance in time.
Figure 10:
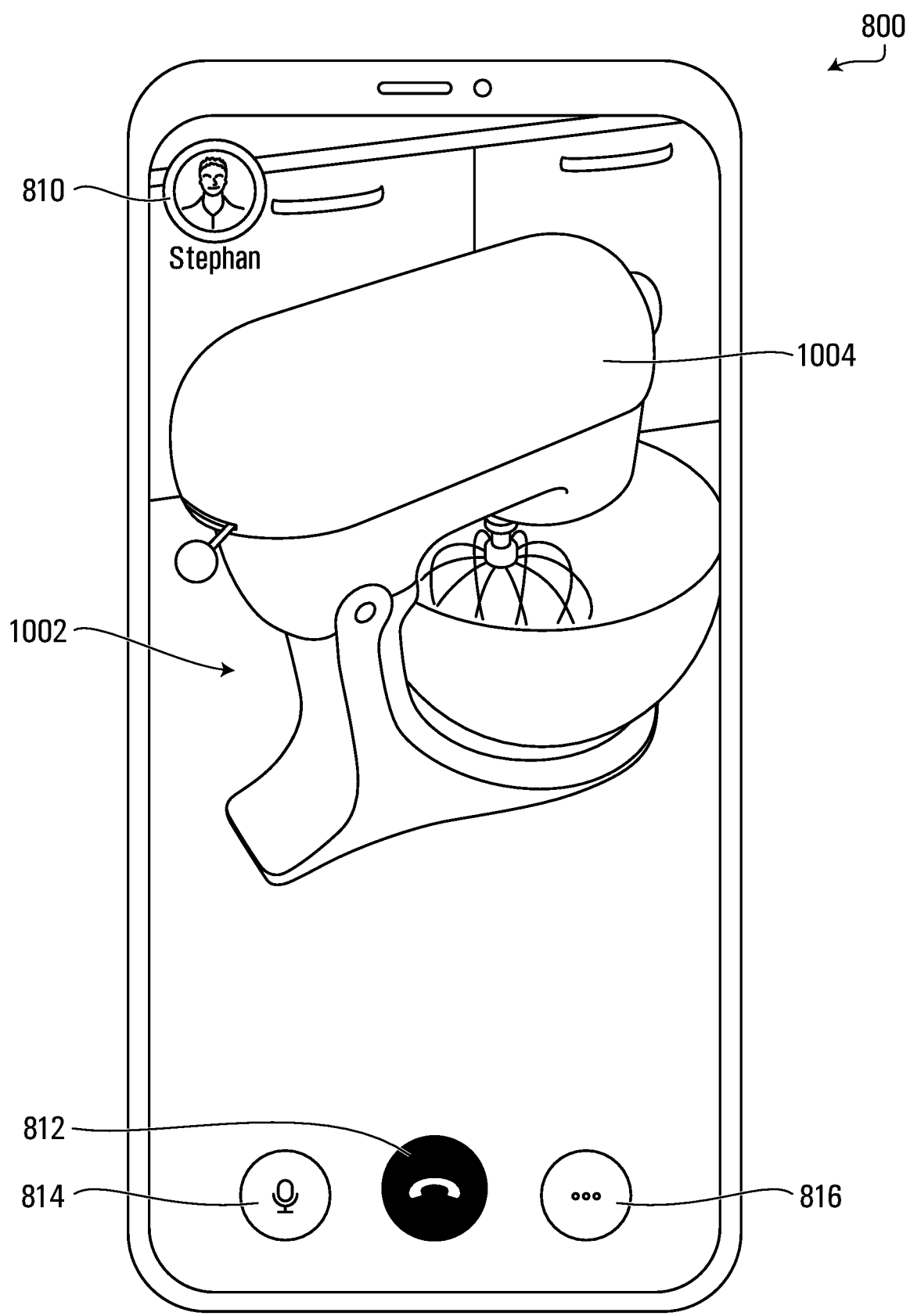
FIG. 10 illustrates the customer device of FIG. 8 displaying AR content for the shared AR experience of FIG. 7 at the second instance in time.

Reference will now be made to FIGS. 7 to 10, which illustrate a shared AR experience for a customer and a merchant, according to an embodiment. The customer and the merchant are users that are in different physical locations but are virtually interacting with a stand-up kitchen mixer in the shared AR experience using their respective devices. FIG. 7 is a perspective view of a virtual coordinate system 700 of the shared AR experience at a first instance in time, FIG. 8 illustrates a customer device 800 displaying AR content 802 for the shared AR experience at the first instance in time, FIG. 9 is a perspective view of the virtual coordinate system 700 of the shared AR experience at a second instance in time, and FIG. 10 illustrates the customer device 800 displaying further AR content 1002 for the shared AR experience at the second instance in time. In FIGS. 8 and 10, the customer device 800 also displays an indication 810 that the merchant is present in the shared AR experience, an option 812 to exit the shared AR experience, an option 814 to mute the microphone of the customer device 800 so that the merchant cannot hear the customer, and an option 816 to access other functionality. The shared AR experience of FIGS. 7 to 10 could be provided, at least in part, using the method 600.

The shared AR experience for the merchant and the customer illustrated in FIGS. 7 to 10 could be initiated in any of a number of different ways. In some implementations, the shared AR experience is initiated in step 602 of the method 600. In one example, the customer could initiate a personal AR experience on the customer device 800 to view and/or interact with the mixer virtually in their kitchen. The customer might then invite the merchant into the AR experience if, for example, the customer has a question for the merchant regarding the mixer. The act of inviting the merchant into the AR experience could initiate a multi-user AR experience. In another example, the AR experience could be initiated for the customer and the merchant at the same time. As such, the AR experience is initiated as a multi-user AR experience. The customer may initiate a shared AR experience with the merchant in order to ask the merchant questions regarding the mixer. Alternatively, the customer could send a question to the merchant regarding the mixer, and the merchant could initiate the shared AR experience with the customer to help answer the customer's question.

As shown in FIGS. 7 and 9, the virtual coordinate system 700 is a cartesian coordinate system including an x-axis, y-axis and z-axis. A 3D virtual model 702 of the stand-up kitchen mixer is positioned at the origin of the virtual coordinate system 700. The position of the model 702 does not change between the first instance in time and the second instance in time. As such, the model 702 could be considered anchored in the virtual coordinate system 700. In some implementations, the model 702 is obtained in step 604 of the method 600.

A 3D virtual model 704 of the customer and a 3D virtual model 706 of the merchant are also positioned within the virtual coordinate system 700. Each of the models 704, 706 depicts a virtual hand holding a virtual user device. The positions of the models 704, 706 in the virtual coordinate system 700 correspond to the positions of the customer and the merchant, respectively, which may be determined in steps 606, 608 of the method 600. For example, based on information obtained from the customer device 800, the position of the customer within the virtual coordinate system 700 may be determined. The customer device 800 may obtain a representation of the customer's kitchen through optical images, lidar and/or radar, and determine the customer's position within the kitchen. The customer could indicate that they wish the model 702 of the mixer to be positioned on a kitchen counter at a particular orientation. The virtual coordinate system 700 may then be mapped to the representation of the kitchen to position the model 702 of the mixer on the kitchen counter, as shown in FIGS. 8 and 10. Similarly, the position of the merchant within the virtual coordinate system 700 may be determined based on information from a merchant device (not shown).

The positions of one or both of the models 704, 706 in the virtual coordinate system 700 may change between the first instance in time and the second instance in time, the change in positions corresponding to movement of the customer and/or the merchant within the virtual coordinate system 700. For example, as shown in FIGS. 7 and 8, at the first instance in time the customer and the merchant are generally positioned on opposite sides of the model 702 of the mixer in the virtual coordinate system 700. Later, at the second instance in time shown in FIGS. 9 and 10, the customer and the merchant are generally positioned on the same side of the model 702 of the mixer in the virtual coordinate system 700. The movement of the customer between the first instance in time and the second instance in time may correspond to the customer physically moving within their kitchen. The customer device 800 can continuously determine the position of the customer in the kitchen through measurements and map this position to the virtual coordinate system 700 using the fixed position of the mixer on the counter of the kitchen.

The AR content 802, 1002 are examples of AR content that could be generated in separate instances of step 612 of the method 600. In a first instance of step 612, the AR content 802 may be generated. The AR content 802 includes a virtual representation 804 of the mixer and a virtual representation 806 of the merchant. The virtual representation 804 is a render of the model 702 of the mixer generated based on the position of the customer in the virtual coordinate system 700 at the first instance in time. Likewise, the virtual representation 806 is a render of the model 706 generated based on the position of the customer and the position of the merchant in the virtual coordinate system 700 at the first instance in time. In a second instance of step 612, the AR content 1002 may be generated. The AR content 1002 also includes a virtual representation 1004 of the mixer, which is a render of the model 702 of the mixer generated based on the position of the customer in the virtual coordinate system 700 at the second instance in time.

As illustrated, the AR content 802, 1002 is overlaid on an image of the customer's kitchen that is captured by the customer device 800. As such, the customer can view the mixer in their kitchen through the virtual representations 804, 1004. Further, the customer can see how the merchant is viewing the mixer at the first instance in time through the virtual representation 806 of the merchant. Based on the position of the mobile device depicted in the virtual representation 806, the customer can appreciate the point of view of the merchant. The orientation of the mobile device depicted in the virtual representation 806 is an example of an indication of an orientation of the merchant in the virtual coordinate system 700. By virtue of the shared AR experience, the merchant and the customer are able to appreciate each other's view of the mixer, which provides context for their communication.

As shown in FIG. 9, the merchant is not in sight of the customer in the virtual coordinate system 700 at the second instance in time. Therefore, the AR content 1002 does not include a virtual representation of the merchant. However, the AR content 1002 can still provide an indication of the position of the merchant in the virtual coordinate system 700 at the second instance in time. For example, audio content corresponding to a recording of the merchant's voice could be included in the AR content 1002. This audio content may include a directionality that corresponds to the position of the merchant relative to the position of the customer in the virtual coordinate system 700. The customer may therefore be able to determine the position of the merchant in the virtual coordinate system 700 at the second instance in time based on the directionality of the audio content.

Although not shown in FIGS. 7 to 10, virtual content could also be generated for the merchant in the shared AR experience. In some implementations, the virtual content for the merchant is AR content. However, the virtual content might instead be VR content or simply be a view of the 3D model 702 of the mixer. The virtual content for the merchant can be output to a merchant device. In some implementations, the virtual content for the merchant can include an image captured by the customer device 800. This may provide the merchant with insight into the real-world space (i.e., the customer's kitchen) that the customer wishes to use for the product.

Generating Multi-User AR Content with Virtual Representations of User Interactions FIGS. 6 to 10 relate to implementing virtual representations of different users in a multi-user AR experience, which can help improve user communication within the AR experience. However, methods for improving the communication between multiple users in an AR experience are not limited to the implementation of virtual representations of users. Another aspect of the present disclosure relates to generating multi-user AR content that includes virtual user interactions. This multi-user AR content can provide a shared, interactive AR experience for multiple simultaneous users. The virtual interactions of one user within the AR experience are conveyed to the other user(s) in the AR experience. Examples of such interactions include a user gesturing towards a virtual item in the AR experience and even touching the virtual item. Displaying virtual interactions in the AR experience can help improve non-verbal communication between the different users.

Figure 11:
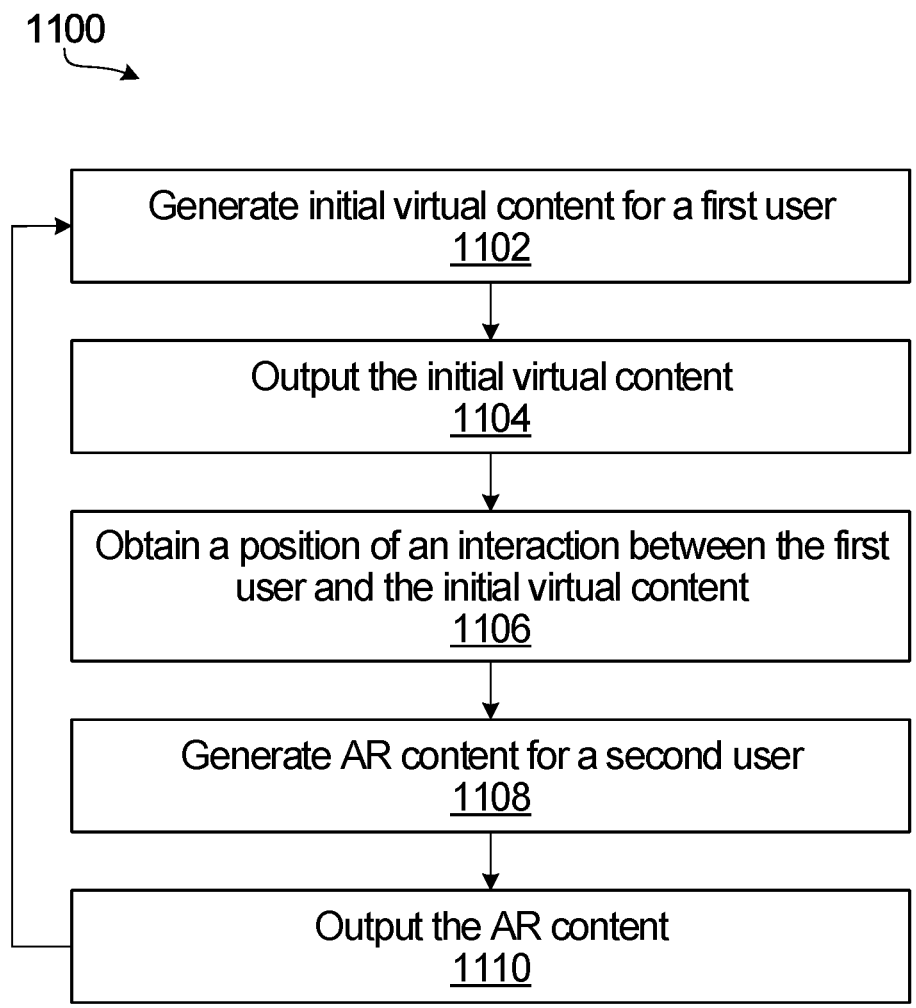
FIG. 11 is a flow diagram illustrating a method of generating AR content for a shared AR experience with virtual user interactions, according to an embodiment.

FIG. 11 is a flow diagram illustrating a method 1100 of generating AR content for a shared AR experience with virtual user interactions, according to an embodiment. The method 1100 will be described as being performed by the AR engine 502 of FIG. 5, with the shared AR experience including at least the first user of the user device 530a and the second user of the user device 530b. However, at least a portion of the method 1100 could instead be performed elsewhere, such as at the user device 530a and/or the user device 530b, for example.

Step 1102 is an optional step that includes the processor 504 generating initial virtual content for presentation to the first user in the shared AR experience. This initial virtual content, which may be AR content or VR content, for example, can be generated using any method disclosed herein. For example, the initial virtual content could be AR content that is generated using the method 600 of FIG. 6. The initial virtual content can include a render of a 3D model defined within the virtual coordinate system of the shared AR experience. The initial virtual content can also include other content, such as a virtual representation of the second user, audio content and/or haptic content.

In step 1104, the processor 504 outputs the initial virtual content for presentation at the user device 530*a*. As such, the first user is able to view and/or interact with the initial virtual content via the user device 530*a*. In some implementations, the initial virtual content that is generated in step 1102 is AR content that is generated for the second user. The first user can therefore see the AR scene that the second user is viewing in step 1104.

Step 1106 includes the processor 504 obtaining a position of an interaction between the first user and the initial virtual content presented at the user device 530*a*. The position of the interaction may then be stored in the memory 506 or in another non-transitory computer readable medium. The interaction between the first user and the initial virtual content can include any action performed by the first user that relates to the initial virtual content. By way of example, the interaction could include the first user virtually pointing towards, grabbing or even touching the render of the model in the initial virtual content. Because the render of the model is defined within the virtual coordinate system, the position of the interaction can be determined within the virtual coordinate system. In some cases, a type of interaction is also determined in step 1106. For example, interactions may be categorized as pointing, grabbing or touching interactions.

The position of an interaction between the first user and the initial virtual content may be determined in any of a number of different ways, which may depend on the form of the virtual content. For example, user interactions with VR content may differ from user interactions with AR content, and as a result the methods for determining the position of an interaction can differ for AR content and VR content.

In some implementations, the interaction between the first user and the initial virtual content includes the first user selecting a two-dimensional (2D) point in the initial virtual content using the user device 530*a*. For example, the user device 530*a* may include a 2D display screen that displays at least part of the initial virtual content to the first user. The first user can select a point on the display screen that corresponds to a 2D point in the initial virtual content. If the display screen is a touch screen, then the 2D point can be selected using a touch action. Alternatively, the 2D point could be selected using a cursor such as a mouse cursor, for example. In some cases, the first user might be pointing towards a particular component in the render of the model in the initial virtual content, and the 2D point could correspond to this component in the render of the model.

The 2D point in the initial virtual content that is selected by the first user can be mapped to the virtual coordinate system to determine a position of the interaction within the virtual coordinate system. This mapping may be based on the position (including the location and the orientation) of the first user within the virtual coordinate system. Steps 606, 608 of the method 600 provide examples of obtaining the position of a user in a virtual coordinate system.

In some implementations, the 2D point in the initial virtual content is mapped to a 2D point in a plane of the virtual coordinate system that corresponds to the position of the first user within the virtual coordinate system. A normal vector to the plane defines the viewpoint or perspective of the first user in the virtual coordinate system. As such, a normal vector that extends through the 2D point in the plane can provide a 3D line extending in the direction of the first user's perspective in the virtual coordinate system. The normal vector may intersect with the model in the virtual coordinate system, and the resulting 3D point of intersection in the virtual coordinate system can form the basis of the position of the interaction between the first user and the initial virtual content.

Accordingly, when the interaction between the first user and the initial virtual content includes a selection of a 2D point in the initial virtual content, the position of the interaction may be based on the position of the first user within the virtual coordinate system as well as on the position of the 2D point in the initial virtual content. In such cases, step 1106 can include mapping the 2D point in the initial virtual content to a 2D point in a plane of the virtual coordinate system based on the position of the first user within the virtual coordinate system. A vector that extends through the 2D point in the plane of the virtual coordinate system and is perpendicular to the plane of the virtual coordinate system can then be determined. The position of the interaction between the first user and the initial virtual content may be based on a 3D point of intersection within the virtual coordinate system where the vector intersects with the model. An orientation of the interaction can be based on the orientation of the vector relative to the model within the virtual coordinate system.

In some implementations, the interaction between the first user and the initial virtual content occurs using a feature of the first user (for example, the first user's hand) that is mapped to the virtual coordinate system of the shared AR experience. This feature of the first user can include any means for the first user to interact with the initial virtual content, and in some cases will depend on the form of the initial virtual content generated in step 1102. The feature of the first user may be controllable in 3D, allowing the first user unrestricted movement of the feature within the virtual coordinate system.

When the interaction between the first user and the initial virtual content occurs using a feature of the first user, the position of the interaction within the virtual coordinate system may be based on the position of the feature within the virtual coordinate system. As such, step 1106 can include obtaining the position of the feature within the virtual coordinate system. In some implementations, the position of the feature within the virtual coordinate system is determined based on the position of the feature within a real-world or virtual space associated with the first user. A representation of this space and a position of the model within the space may be obtained, allowing the virtual coordinate system to be mapped to the space based on the position of the model within the space. This mapping enables the position of the feature within the virtual coordinate system to be determined based on the position of the feature within the space. It should be noted that determining the position of the feature of the first user within the space and/or within the virtual coordinate system can include determining an orientation of the feature. Further details regarding mapping a virtual coordinate system to a real-world or virtual space can be found elsewhere herein.

In some implementations, the initial virtual content for the first user includes AR content and the feature of the first user is a real-world feature that is mapped from a real-world space to the virtual coordinate system. An example of a real-world feature is an anatomical feature such as the hand of a user. When the virtual coordinate system is mapped to a representation of the real-world space surrounding the first user, the position of the real-world feature in the virtual coordinate system can be determined.

In some implementations, the representation of the real-world space surrounding the first user is generated based on an image captured by the user device 530*a*. Here, determining the position of the feature of the first user within the space can include performing image analysis on the image. The image analysis may be performed using the image analyzer 514. By way of example, the user device 530*a* may obtain images or other measurements that can recognize the first user's hand and determine the position of the hand within the real-world space. The first user may wear AR-specific gloves to help improve the detectability of their hand in the real-world space. The position of the first user's hand can then be mapped to the virtual coordinate system. The first user can move their hand within the real-world space, resulting in corresponding movements of the first user's hand in the virtual coordinate system. The first user can therefore interact with the AR content by pointing towards or touching the model in the virtual coordinate system, for example.

The position of an anatomical feature of the first user in the virtual coordinate system may correspond to the position of an interaction between the first user and the initial virtual content. In some implementations, the detection of the anatomical feature of the first user in the real-world space can be considered an interaction with the initial virtual content. Therefore, the position of the anatomical feature in the virtual coordinate system can be continuously determined. In some implementations, measurements of the anatomical feature in the real-world space are analyzed to detect discrete actions performed by the anatomical feature that are construed as interactions with the initial virtual content. For example, in the case that the anatomical feature is the first user's hand, gestures such as pointing and grabbing could be detected and construed as interactions. The position of the hand when executing these gestures could then be determined.

The feature of the first user might not always be a real-world feature. Instead, the feature could be a virtual feature controlled by the first user using the user device 530*a*. This may be the case if the initial virtual content is VR content or is an AR scene that has been generated for the second user. An example of a virtual feature is a cursor controlled by the first user using the user device 530*a*. The user device 530*a* could include one or more controls (such as joysticks) that enable movement of the cursor. The cursor can be mapped to the virtual coordinate system of the shared AR experience, allowing the first user to navigate the cursor to 3D points within the virtual coordinate system. The cursor can be used to interact with the initial virtual content, and therefore the position of the cursor can correspond to the position of an interaction between the first user and the initial virtual content within the virtual coordinate system.

Obtaining the position of the interaction between the first user and the initial virtual content in step 1106 may include obtaining information from the user device 530*a*. The form of this information will depend on the type of interaction between the first user and the initial virtual content. If the interaction includes a selection of a 2D point in the initial virtual content using the first user device, then the information obtained from the user device 530*a* can include an indication of this 2D point. For example, a coordinate or pixel corresponding to the 2D point in the initial virtual content could be included in the information obtained from the user device 530*a*. If the interaction includes the use of a feature of the first user that has been mapped to the virtual coordinate system, then the information obtained from the user device 530*a* can include an indication of the position of the feature of the first user. Examples of such information include measurements of an anatomical feature of the first user in a real-world space, and/or an indication of the position of a cursor controlled by the first user using the user device 530*a*.

It should be noted that, in some cases, step 1106 can include obtaining the positions of multiple user interactions in the virtual coordinate system of the shared AR experience. These user interactions may be performed by the first user, the second user and/or other users in the shared AR experience.

In some implementations, at least some of step 1106 could be performed by the user device 530*a*. For example, the user device 530*a* could be used to help obtain a position of an anatomical feature of the first user within a real-world space and/or the virtual coordinate system. The user device 530*a* may perform image analysis to help determine the position of the feature within the real-world space.

Step 1108 includes the processor 504 generating AR content for the second user. The AR content includes a render of the model in the shared AR experience that is based on a position of the second user within the virtual coordinate system. Examples of determining the position of a user are provided in steps 606, 608 of the method 600. The AR content further includes a virtual representation of the interaction between the first user and the initial virtual content based on the position of the interaction determined in step 1106 and optionally on the position of the first user in the virtual coordinate system. Accordingly, through the AR content generated in step 1108, the second user may view the first user's interaction in the virtual coordinate system. This can allow the first user and the second user to non-verbally communicate through references to the model in the shared AR experience. Virtual representations of other user interactions (performed by the first user, the second user, and/or another user in the shared AR experience), a virtual representation of the first user, audio content and/or haptic content can also be included in the AR content generated in step 1108.

The AR content generated in step 1108 may reflect the relative positions of the first user, the second user, the first user's interaction, and the model within the virtual coordinate system. As such, if the interaction between the first user and the initial virtual content occurs at a position within the virtual coordinate system that corresponds to a particular component of the model, then the AR content can depict the interaction at this particular component of the model. In other words, the AR content may show that the interaction corresponds to the particular component of the model.

The form of a virtual representation of an interaction in AR content is not limited herein. One or more objects, symbols, lights and/or colors can be used to provide a virtual representation of an interaction in AR content. In one example, if the interaction includes the first user using a display screen to select a 2D point in the initial virtual content, then the virtual representation of the interaction can include the position of the interaction in the virtual coordinate system being illuminated, circled or changed to a different color. In another example, if the interaction includes a real-world pointing gesture performed using the first user's hand, then the virtual representation of the interaction can include an object in the shape of a hand performing a pointing gesture. The shape of the hand may reflect a measured shape of the first user's hand.

In some implementations, the virtual representation of the interaction in the AR content includes an indication of the orientation of the interaction in the virtual coordinate system. If the position of the interaction is determined based on a vector extending from a 2D point, then the orientation of the interaction may be based on the direction of the vector. The virtual representation of the interaction can provide an indication of the orientation of the vector using an arrow, for example. If the position of the interaction is based on the position of a feature of the first user, then the representation of the interaction can include an indication of the orientation of the feature. By way of example, when the virtual representation of the interaction includes a virtual pointing gesture, the orientation of the pointing gesture can be based on the orientation of the interaction in the virtual coordinate system. Alternatively, the orientation of the pointing gesture can be based on (e.g., solely on) the position of the second user, such that the pointing gesture is at a fixed orientation to the second user. For example, the direction of the pointing gesture could be perpendicular to the viewpoint of the customer so that the customer can better appreciate the direction of the pointing gesture.

Step 1110 includes the processor 504 outputting the AR content for presentation at the user device 530*b*. In some cases, step 1110 is performed in a similar manner to step 614 of the method 600.

As illustrated using the arrow from step 1110 to step 1102, the method 1100 may be repeated multiple times. In each instance of the method 1100, updated virtual content can be generated and presented to the first user, a position of an interaction between the first user and the virtual content can be obtained. Updated AR content including a representation of the interaction can then be generated and presented to the second user. The first user may start, stop and/or alter their interactions during the multiple instances of the method 1100, which is conveyed in the updated AR content generated for the second user.

It should be noted that the method 1100 could also be performed to generate AR content for the first user that includes virtual representations of interactions between the second user and the AR content for the second user. In these cases, steps 1102, 1104 could be similar to steps 1108, 1110, but generate AR content for the first user rather than for the second user, and step 1106 could determine the positions of the interactions between the second user and the AR content.

FIGS. 12 to 16 illustrate examples of user interactions in a shared AR experience, which is the same AR experience discussed above with reference to FIGS. 7 to 10. The shared AR experience includes the customer and the merchant interacting with the model 702 of the stand-up kitchen mixer in the virtual coordinate system 700. The shared AR experience of FIGS. 12 to 16 could be provided, at least in part, using the method 1100.

Figure 12:
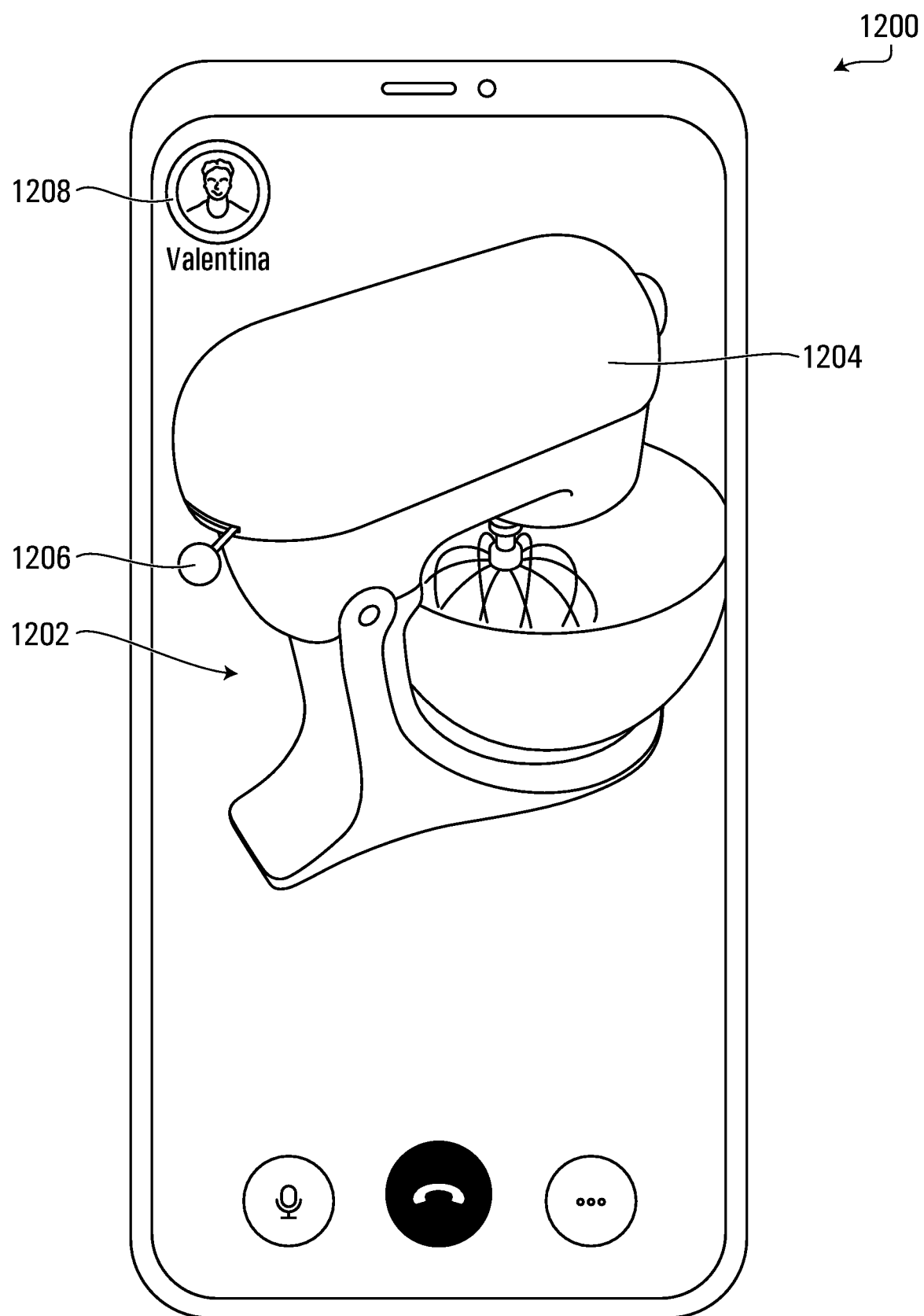
FIG. 12 illustrates a merchant device displaying virtual content for the shared AR experience of FIG. 7.

FIG. 12 illustrates a merchant device 1200 displaying virtual content 1202 for the shared AR experience. The virtual content 1202 includes a render 1204 of the model 702 of the mixer overlaid onto an empty space. The render 1204 of the model 702 is generated based on the position of the merchant relative to the model 702 in the virtual coordinate system 700. The virtual content 1202 is not overlaid onto any real-world space surrounding the merchant, and therefore the virtual content 1202 could be considered VR content. In some implementations, the virtual content 1202 is generated in step 1102 of the method 1100. The merchant device 1200 further displays an indication 1208 that the customer is present in the shared AR experience.

The merchant can interact with the virtual content 1202 using the merchant device 1200, and the position of this interaction between the merchant and the virtual content 1202 may be determined in step 1106 of the method 1100.

Figure 13:
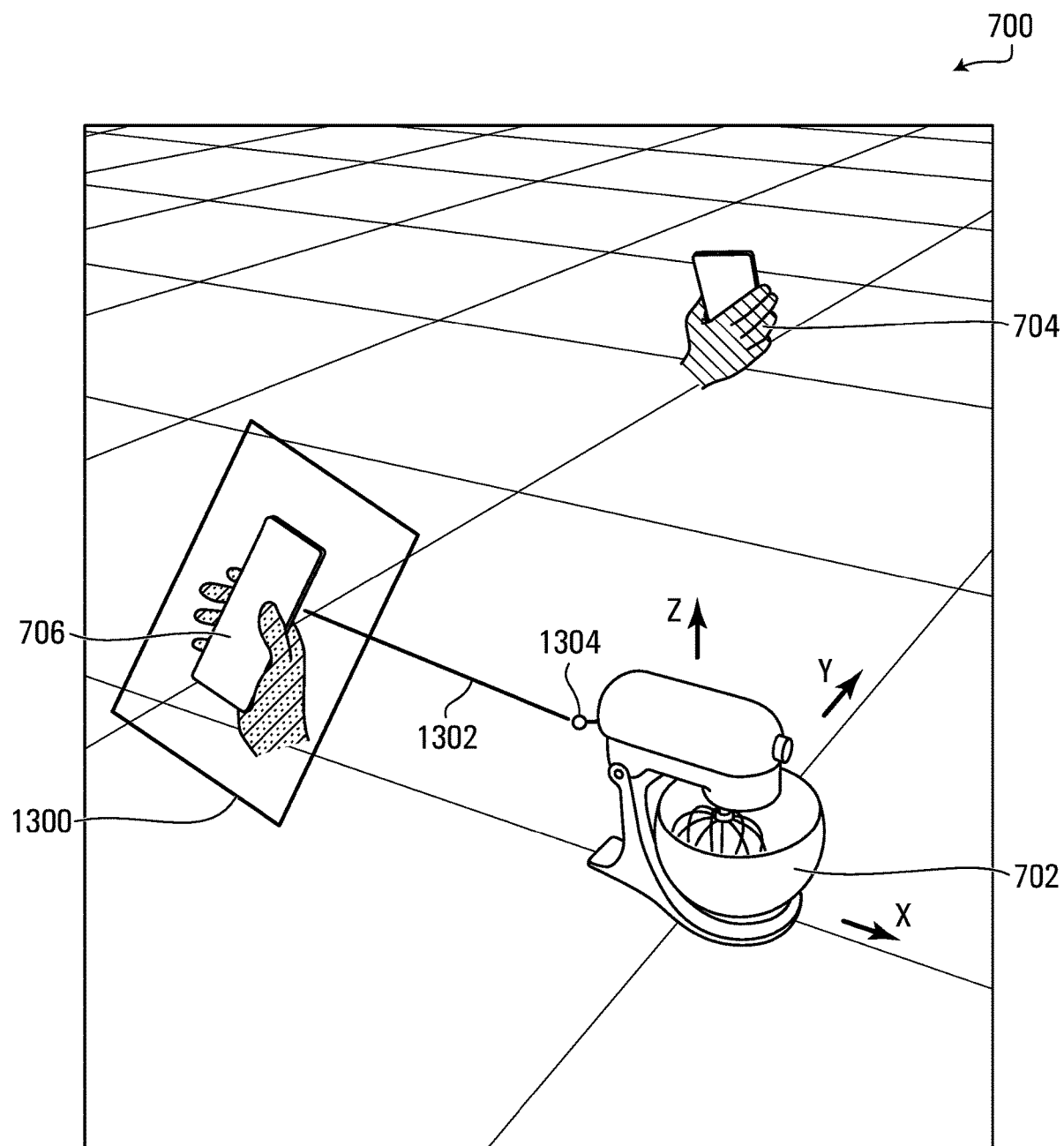
FIG. 13 is a perspective view of the virtual coordinate system for the shared AR experience of FIG. 7 during a first example interaction between the merchant and the virtual content of FIG. 12.
Figure 14:
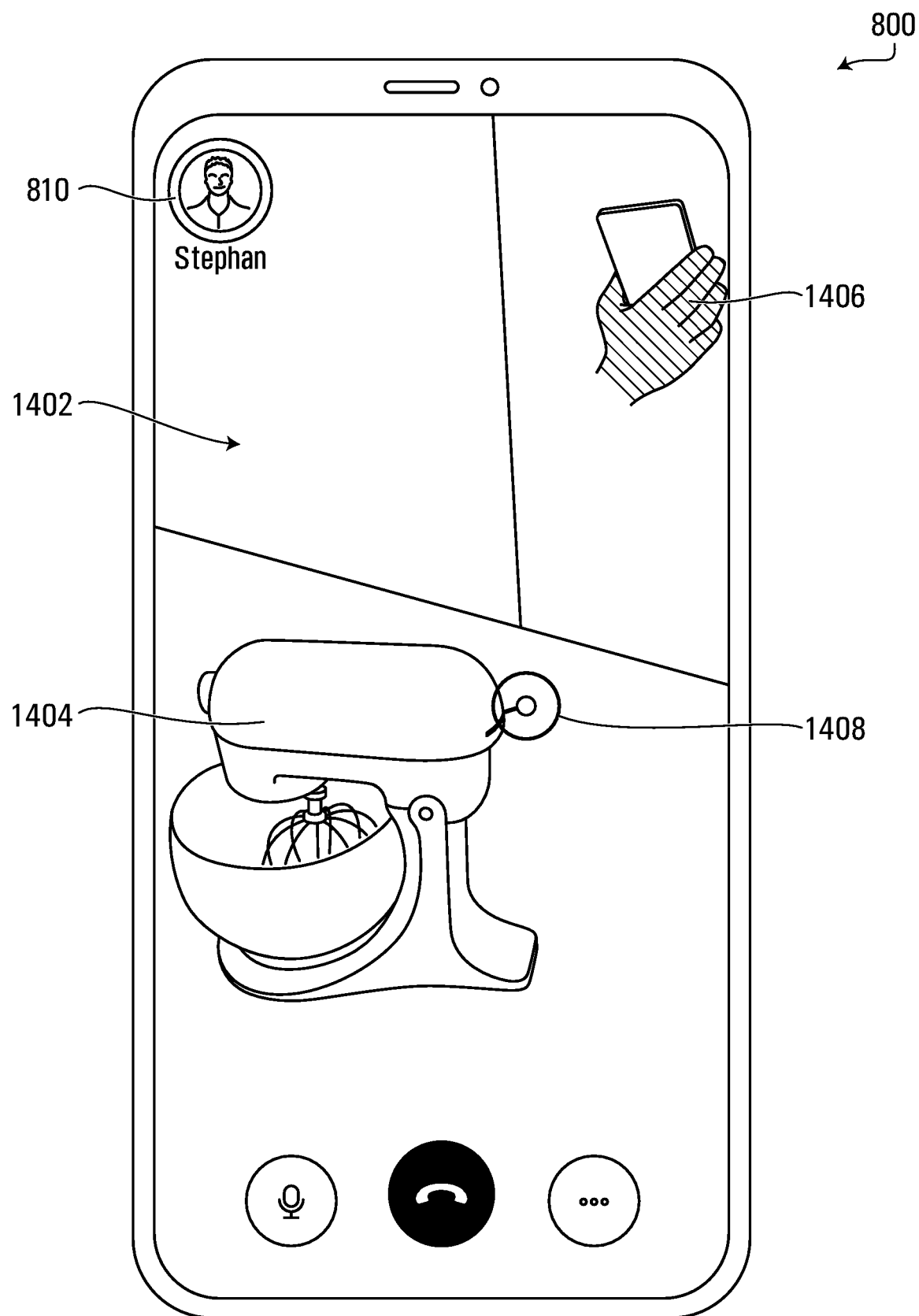
FIG. 14 illustrates the customer device of FIG. 8 displaying AR content for the shared AR experience of FIG. 7 during the first example interaction between the merchant and the virtual content of FIG. 12.

FIGS. 13 and 14 illustrate a first example of an interaction between the merchant and the virtual content 1202. FIG. 13 is a perspective view of the virtual coordinate system 700 for the shared AR experience during the first example interaction. FIG. 13 includes the model 702 of the mixer, the model 704 of the customer and the model 706 of the merchant. In the first example interaction between the merchant and the virtual content 1202, the merchant selects a 2D point (indicated at 1206 in FIG. 12) in the virtual content 1202 using their finger or a cursor. The selected 2D point 1206 corresponds to a knob of the mixer. To determine the position of the first example interaction in the virtual coordinate system 700, the selected 2D point 1206 in the virtual content 1202 is mapped to a 2D point in a plane 1300 of the virtual coordinate system 700 shown in FIG. 13. The plane 1300 corresponds to the position and perspective of the merchant in the virtual coordinate system 700. A vector 1302 extends from the 2D point in the plane 1300, perpendicular to the plane 1300. The vector 1302 intersects with the model 702 of the mixer in the virtual coordinate system 700. The 3D point of intersection, which is indicated at 1304 in FIG. 13, corresponds to the knob of the mixer. The position of the first example interaction between the merchant and the virtual content 1202 may then be determined based on the 3D point of intersection 1304 and optionally on the orientation of the vector 1302 in the virtual coordinate system 700.

FIG. 14 illustrates the customer device 800 displaying AR content 1402 for the shared AR experience during the first example interaction between the merchant and the virtual content 1202. The AR content 1402 includes a render 1404 of the mixer and a virtual representation 1406 of the merchant, which are based on the respective positions of the customer, the merchant, and the model 702 of the mixer in the virtual coordinate system 700. The AR content 1402 further includes a virtual representation 1408 of the first example interaction between the merchant and the virtual content 1202. The virtual representation 1408 in the AR content 1402 is based on the 3D point of intersection 1304 in the virtual coordinate system 700 relative to the position of the customer. The virtual representation 1408 is depicted as a circle around the knob of the mixer, which is the same knob shown at the selected 2D point 1206 in the virtual content 1202 of FIG. 12. Therefore, although the merchant and the customer have different perspectives in the shared AR experience, the first example interaction between the merchant and the virtual content 1202 is accurately depicted in AR content 1402 for the customer. In some implementations, the AR content 1402 is generated in step 1108 of the method 1100.

Figure 15:
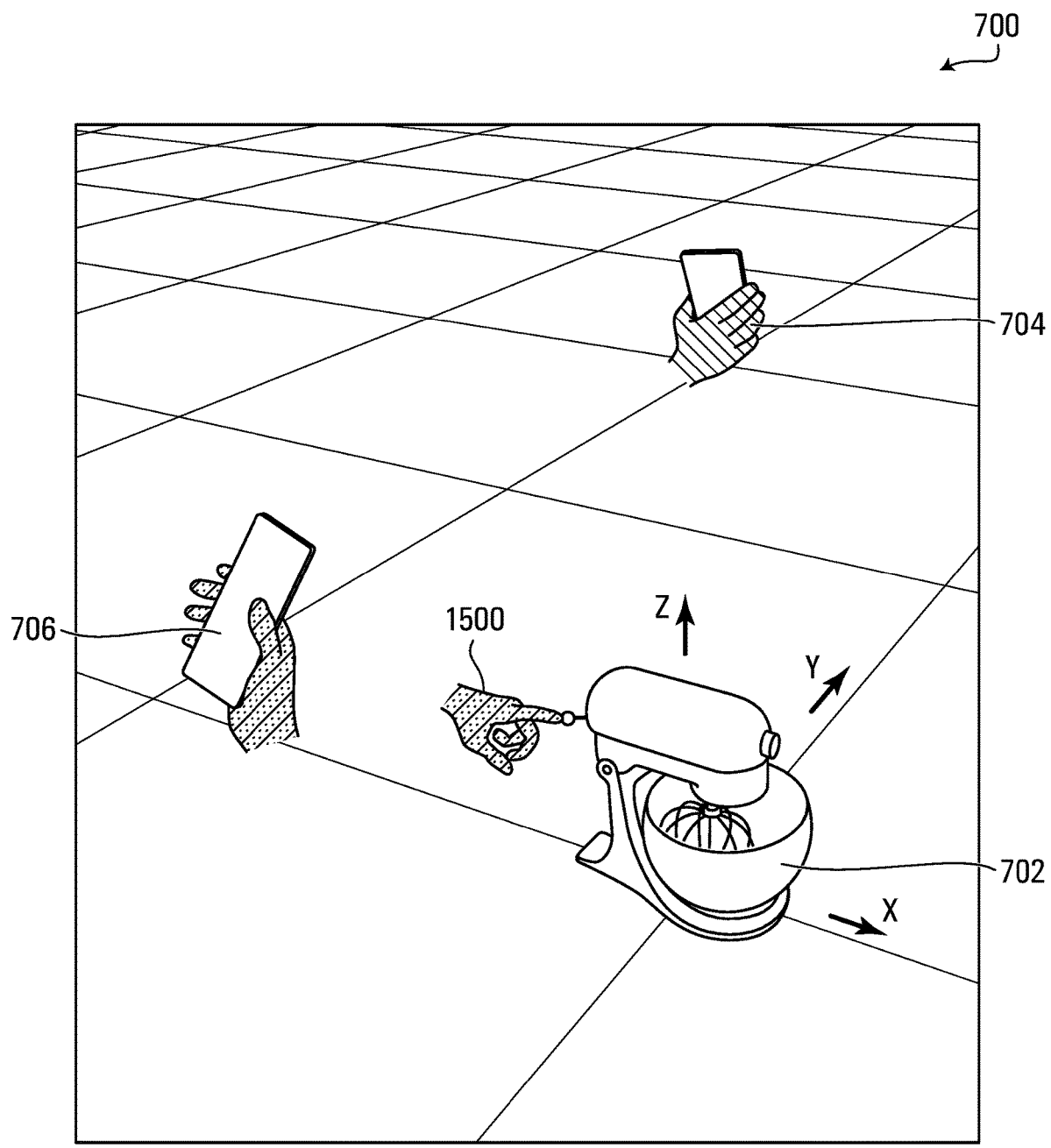
FIG. 15 is a perspective view of the virtual coordinate system for the shared AR experience of FIG. 7 during a second example interaction between the merchant and the virtual content of FIG. 12.
Figure 16:
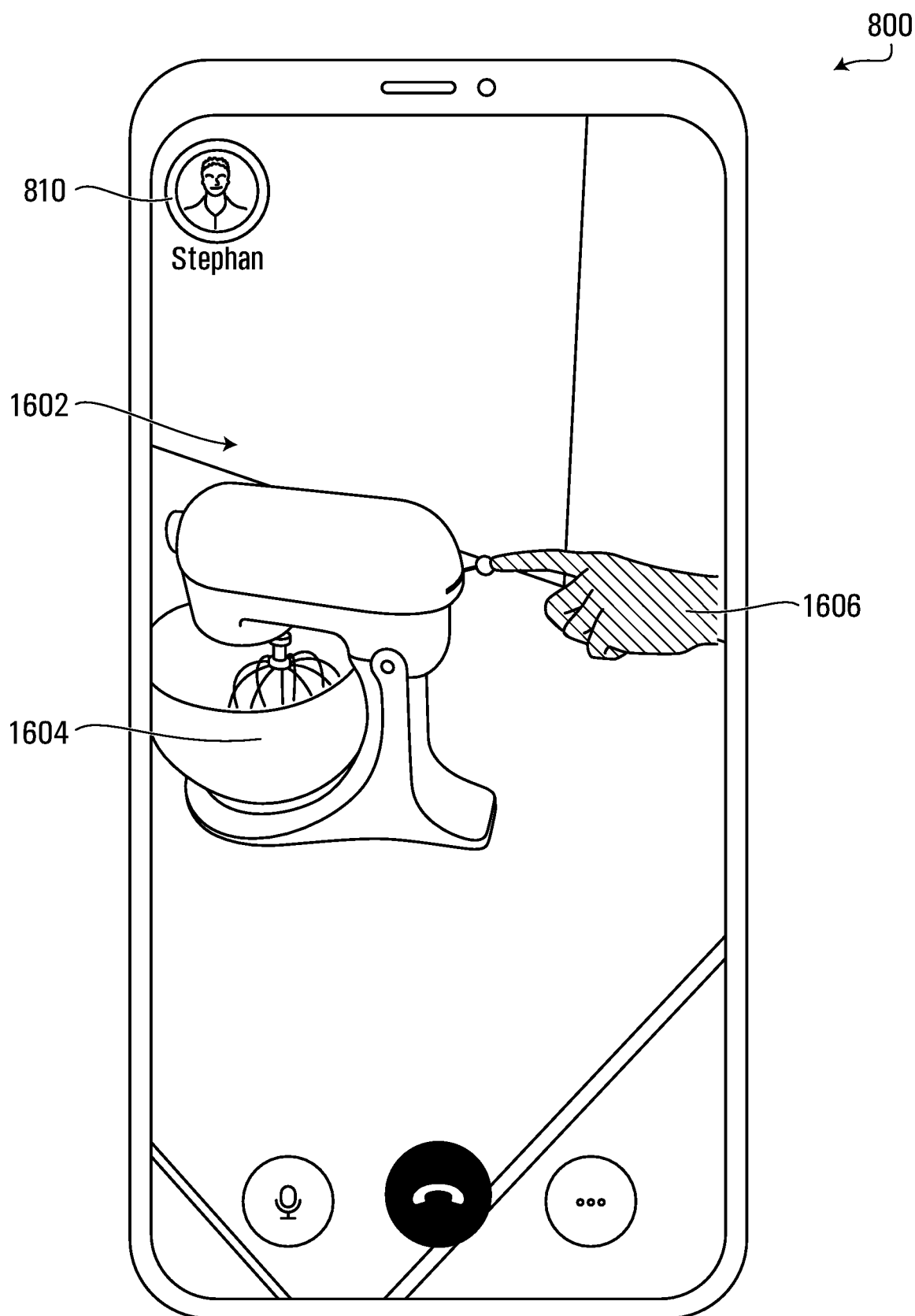
FIG. 16 illustrates the customer device of FIG. 8 displaying AR content for the shared AR experience of FIG. 7 during the second example interaction between the merchant and the virtual content of FIG. 12.

FIGS. 15 and 16 illustrate a second example of an interaction between the merchant and the virtual content 1202, in which the merchant uses their real-world hand to point towards the knob of the mixer. FIG. 15 is a perspective view of the virtual coordinate system 700 for the shared AR experience during the second example interaction. FIG. 15 includes a model 1500 of the merchant's hand. The shape and position of the model 1500 depict the merchant's pointing gesture towards the knob on the model 702 of the mixer.

In some implementations, a camera or another sensor on the merchant device 1200 is used to detect the merchant's hand and determine the position of the merchant's hand in the real-world space surrounding the merchant. The position of the merchant's hand in the virtual coordinate system 700 can then be determined by mapping the virtual coordinate system 700 to the real-world space, as described elsewhere herein.

FIG. 16 illustrates the customer device 800 displaying AR content 1602 for the shared AR experience during the second example interaction between the merchant and the virtual content 1202. The AR content 1602 includes a render 1604 of the model 702 of the mixer based on the respective positions of the customer and the model 702 of the mixer in the virtual coordinate system 700. The AR content 1602 further includes a virtual representation 1606 of the second example interaction between the merchant and the virtual content 1202. The position of the virtual representation 1606 in the AR content 1602 is based on the position of the model 1500 of the merchant's hand in the virtual coordinate system 700 relative to the position of the customer. The virtual representation 1606 is a render of the model 1500 depicting a virtual hand pointing towards the knob of the mixer. In some implementations, the AR content 1602 is generated in step 1108 of the method 1100.

It should be noted that the first example interaction and the second example interaction between the merchant and the virtual content 1202 could also be presented in further virtual content generated for the merchant.

Modifying a Shared AR Experience

Some embodiments of the present disclosure provide methods for modifying a shared AR experience. These methods may include modifying one or more user viewpoints or perspectives in the shared AR experience. In general, each user in a shared AR experience can have a different viewpoint within the shared AR experience that is based, in part, on the user's position within the virtual coordinate system of the shared AR experience. The user's viewpoint is reflected in the virtual content that is generated for the user. For example, a depiction of a virtual item will be based on the user's perspective of the virtual item in the shared AR experience. The modifications to shared AR experiences disclosed herein can alter one or more user viewpoints in a shared AR experience to potentially improve cooperation and collaboration between different users.

According to an aspect of the present disclosure, one user's position in a virtual coordinate system of a shared AR experience may be modified to match another user's position. The two users can then have a shared or common viewpoint within the AR experience. Advantageously, enabling user viewpoints to be shared may improve communication and collaboration within the AR experience. If two user viewpoints at least temporarily overlap, then the two users can have substantially identical frames of reference within the AR experience. These substantially identical frames of reference can provide meaningful context for communication between the two users. For example, referring to the shared AR experience of FIG. 4, the first user could request to view the mixer from the perspective of the second user in order to have a substantially identical view of the mixer as the second user.

Figure 17:
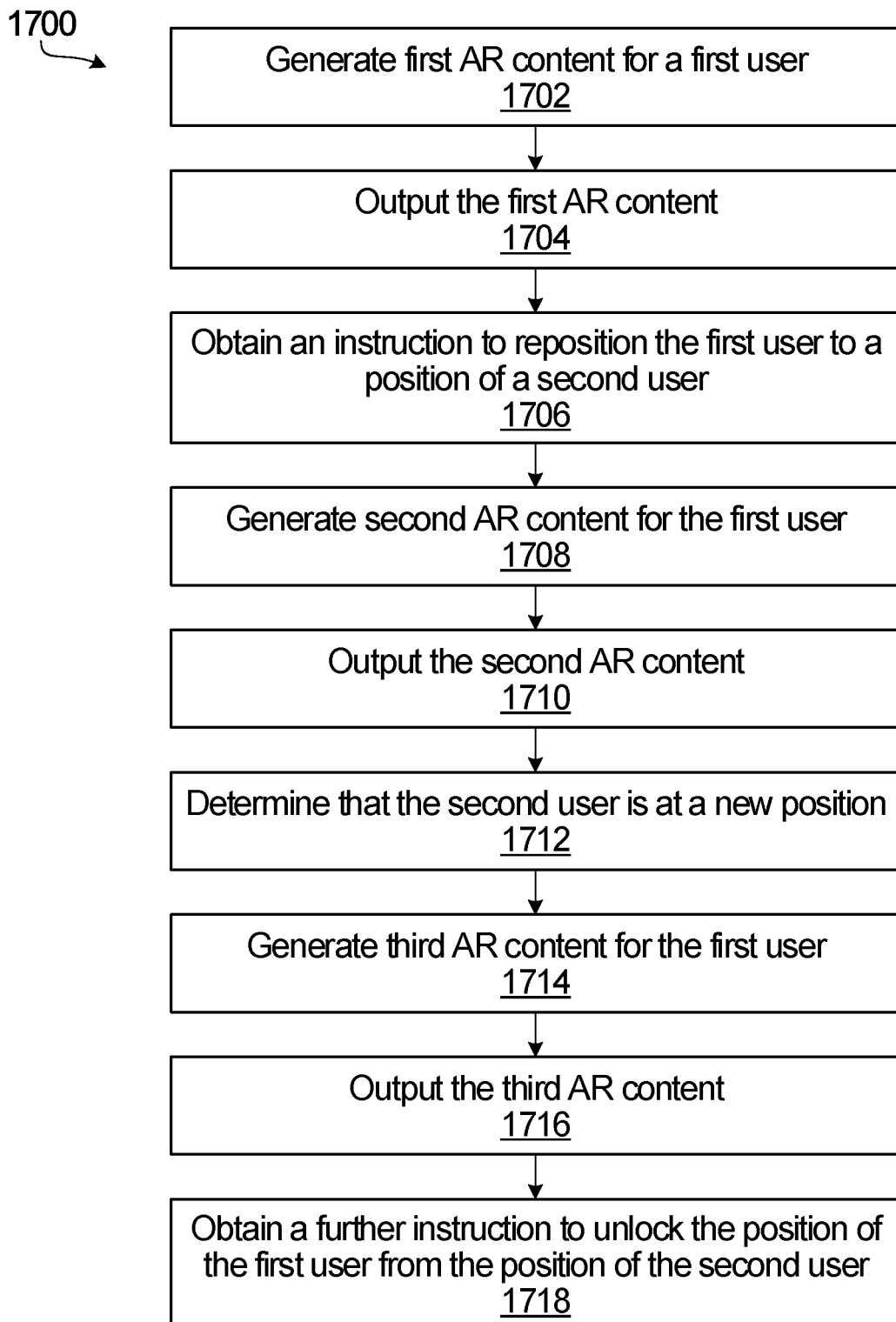
FIG. 17 is a flow diagram illustrating a method for modifying a user's viewpoint in a shared AR experience, according to an embodiment.

FIG. 17 is a flow diagram illustrating a method 1700 for modifying a user's viewpoint in a shared AR experience, according to an embodiment. The method 1700 will be described as being performed by the AR engine 502 of FIG. 5, with the shared AR experience including at least the first user of the user device 530a and the second user of the user device 530b. However, at least a portion of the method 1700 could instead be performed elsewhere, such as at the user device 530a and/or the user device 530b, for example.

Step 1702 includes the processor 504 generating first AR content for the first user. The first AR content includes a first render of a model anchored or defined within a virtual coordinate system of the shared AR experience. This model may be a 3D model of an item, for example. Optionally, the first AR content can also include a virtual representation of the second user, virtual representations of one or more virtual user interactions, audio content and/or haptic content. At step 1704, the processor 504 outputs the first AR content for presentation at the user device 530a.

In some implementations, steps 1702, 1704 could be similar to any, some or all of steps 602, 604, 606, 608, 610, 612, 614 of the method 600 and/or steps 1106, 1108, 1110 of the method 1100.

The first render of the model in the AR content generated in step 1702 is based on an initial position of the first user within the virtual coordinate system of the shared AR experience. The position of the first user in the virtual coordinate system can include a coordinate and an orientation of the first user. As such, the first render is from the viewpoint of the first user at their initial position in the virtual coordinate system.

In some cases, step 1702 includes determining the initial position of the first user within the virtual coordinate system based on first information obtained by the user device 530a. For example, the first information received from the user device 530a can include a representation of a real-world space surrounding the first user. Determining the initial position of the first user within the virtual coordinate system may then include obtaining a position of the model within the space, mapping the virtual coordinate system to the space based on the position of the model within the space, and determining a position of the first user within the space. The initial position of the first user within the virtual coordinate system can be determined based on the position of the first user within the space. Further details and examples of determining the position of a user in a virtual coordinate system are provided above with reference to step 606 of the method 600.

Virtual content can also be generated for the second user in the shared AR experience, which may include a render of the model that is based on the position of the second user in the virtual coordinate system. The position of the second user in the virtual coordinate system can include a coordinate and an orientation of the second user. The first user is initially at a different position than the second user within the virtual coordinate system. As such, the first user and the second user may be viewing the model from different perspectives. However, viewing the model from different perspectives can hinder communication in some situations. For example, the second user may be referencing a particular component of the model that is not in view for the first user. Accordingly, the first user may generate a request to view the model from the position and viewpoint of the second user within the virtual coordinate system. Alternatively, the second user may generate the request for the first user to view the model from their position.

Step 1706 includes the processor 504 obtaining an instruction to reposition the first user to the position of the second user within the virtual coordinate system. The instruction may then be stored in the memory 506 or in another non-transitory computer readable medium. An example of the instruction obtained in step 1706 is a request for the first user to view the model from the viewpoint of the second user within the virtual coordinate system. As noted above, the instruction may be received from the first user via the user device 530a and/or from the second user via the user device 530b.

Any of a number of different operations may be performed by the first user or the second user to generate the instruction to a user device that serves to trigger a repositioning of the first user to the position of the second user within the virtual coordinate system. In an example, the AR content generated for the first user in step 1702 includes a representation of the second user in a different position within the virtual coordinate system. Through the user device 530*a*, the first user may select the representation of the second user in the AR content. The user device 530*a* may then display an option to virtually move to the position of the second user within the virtual coordinate system.

Step 1708 includes the processor 504 generating second AR content for the first user. The second AR content includes a second render of the model based on the position of the second user within the virtual coordinate system. In other words, the first user has moved to the position of the second user in the virtual coordinate system and the first user is viewing the model (and potentially other virtual objects in the AR experience) from the perspective of the second user. Step 1710 includes outputting the second AR content for presentation at the user device 530*a*.

In some implementations, step 1708 includes determining, based on second information obtained by the user device 530*b*, the position of the second user within the virtual coordinate system. The position of the first user within the virtual coordinate system can then be modified to match that of the second user. Following these operations, the position of the first user within the virtual coordinate system can match the position of the second user within the virtual coordinate system, and therefore at least some of the AR content that is generated for the first user in step 1708 may be substantially identical to virtual content generated for the second user. For example, the first user and the second user may both be viewing the second render of the model. This allows the first user and the second user to have a shared perspective of the model in the AR experience.

When the initial position of the first user in the virtual coordinate system is determined based on a position of the first user in a real-world space and a mapping of the virtual coordinate system to the real-world space, step 1708 can include remapping the virtual coordinate system to the real-world space. Remapping the virtual coordinate system can include moving the virtual coordinate system relative to the real-world space of the first user such that the position of the first user within the real-world space corresponds to the position of the second user within the virtual coordinate system. The virtual coordinate system is moved relative to the first user while the first user remains stationary in the real-world space, and therefore the first user moves in the virtual coordinate system without actively moving in the real-world space. The model remains fixed in the virtual coordinate system, and therefore moving the virtual coordinate system relative to the real-world space will also move the model relative to the real-world space.

Remapping the virtual coordinate system within the real-world space of the first user in step 1708 might not affect a mapping of the virtual coordinate system to a space (real-world or virtual) of the second user. As such, the model can remain fixed relative to the space of the second user. The remapping of the virtual coordinate system to the real-world space of the first user may appear as the first user moving within the virtual coordinate system from the perspective of the second user. As such, the position of the second user within the virtual coordinate system can remain fixed despite the modification to the position of the first user within the virtual coordinate system.

In some implementations, the instruction obtained in step 1706 can include an instruction to lock the position of the first user within the virtual coordinate system to the position of the second user within the virtual coordinate system. As a result, movement of the first user and the second user within the virtual coordinate system is at least temporarily synchronized after initially matching the position of the first user to the position of the second user in step 1708. In these implementations, the method 1700 can proceed to optional steps 1712, 1714, 1716, 1718.

In step 1712, the processor 504 determines, based on third information obtained by the second device, that the second user is at a new position within the virtual coordinate system. In other words, the second user has moved in the virtual coordinate system. This may include the second user physically moving within a real-world space that the virtual coordinate system has been mapped to, for example.

The processor 504 generates third AR content for the first user in step 1714, and the processor 504 outputs the third AR content for presentation at the user device 530*a* in step 1716. Because the position of the first user is locked to the position of the second user, the first user is moved to the new position of the second user in step 1714. The third AR content includes a third render of the model based on the new position of the second user within the virtual coordinate system. Thus, the third AR content for the first user can include the same render of the model that is included in the virtual content for the second user when the second user is at the new position within the virtual coordinate system.

As illustrated by the arrow between step 1716 and step 1712, steps 1712, 1714, 1716 can be performed multiple times. This can help ensure that the position of the first user remains locked or fixed to the position of the second user over time. When the position of the second user within the virtual coordinate system changes, the position of the first user in the virtual coordinate system may be modified accordingly. In effect, this gives the second user control over the perspective of the first user. As outlined above, modifying the position of the first user in the virtual coordinate system can include remapping the virtual coordinate system to the real-world space surrounding the first user. Thus, the first user does not have to physically move to stay in the same position as the second user within the virtual coordinate system.

In step 1718, the processor 504 obtains a further instruction to unlock the position of the first user from the position of the second user within the virtual coordinate system. This instruction could be obtained explicitly or implicitly using the user device 530*a*. An example of an explicit request is the first user pressing a button displayed on the user device 530*a* to unlock their position. An example of an implicit indication is the first user moving away from the second user within the virtual coordinate system, which can be interpreted as the first user wishing to move independently in the virtual coordinate system.

Figure 18:
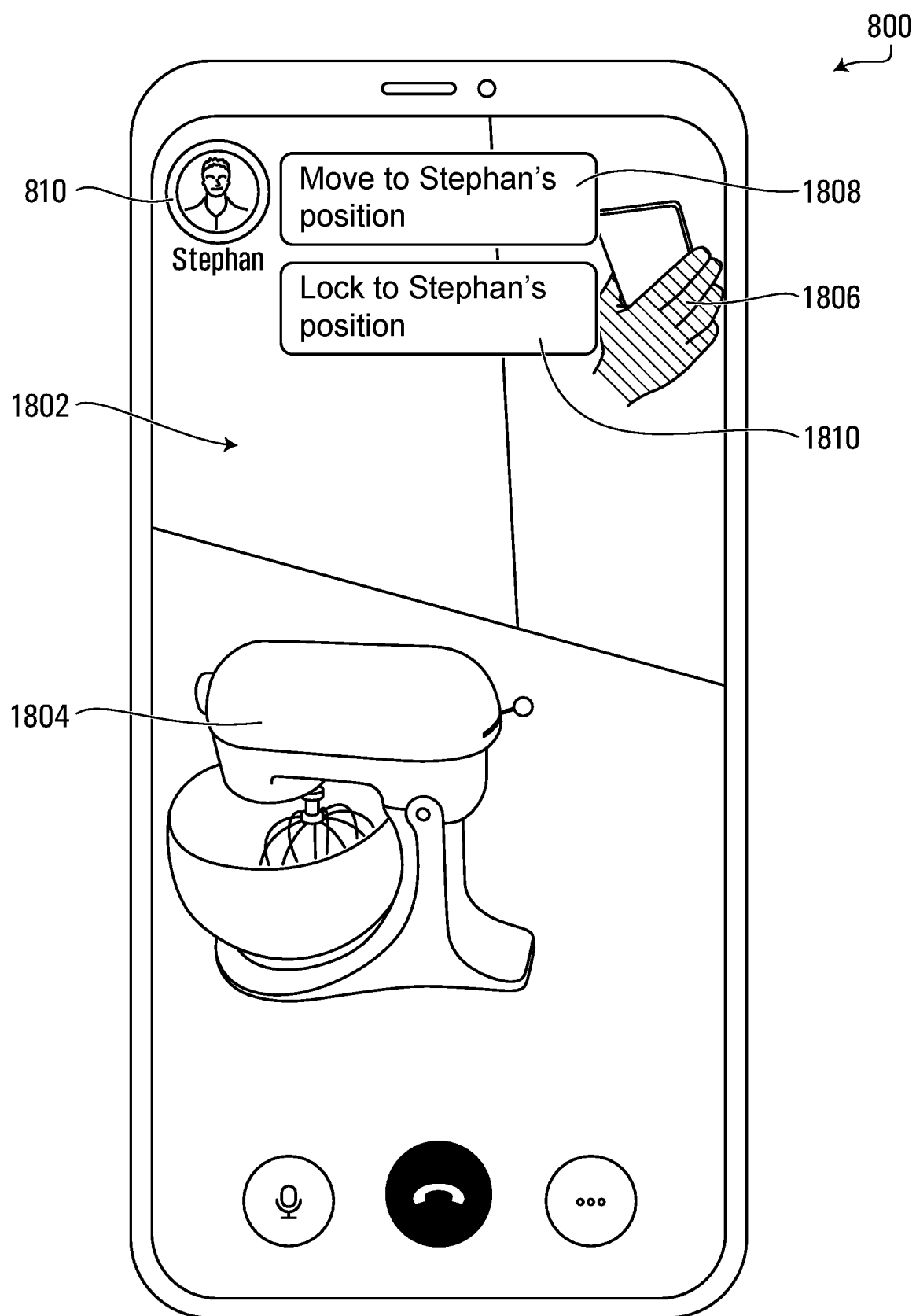
FIG. 18 illustrates the customer device of FIG. 8 displaying further AR content for the shared AR experience of FIG. 7.
Figure 19:
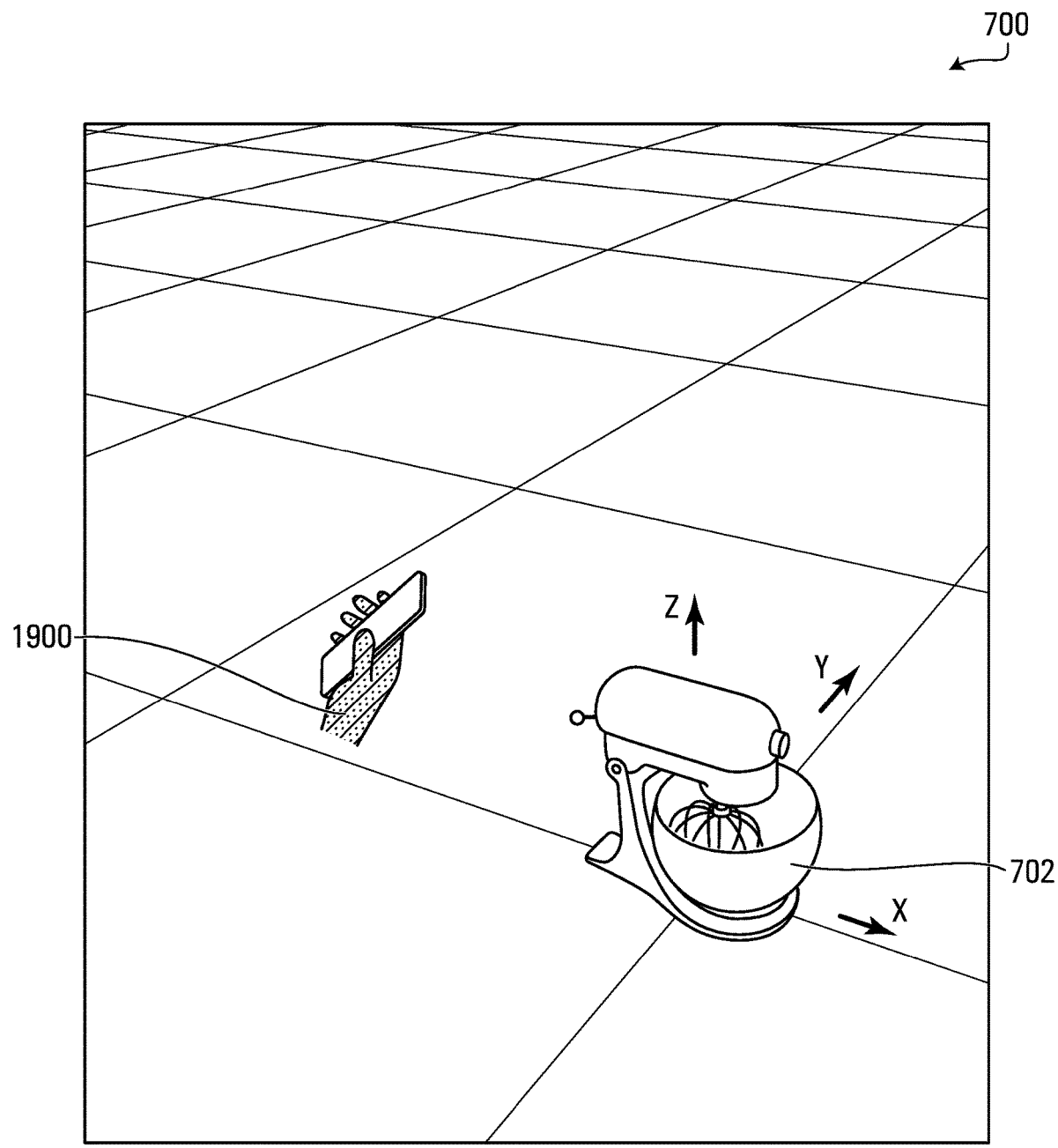
FIG. 19 is a perspective view of the virtual coordinate system for the shared AR experience of FIG. 7 after the customer has been repositioned to the position of the merchant in the virtual coordinate system.
Figure 20:
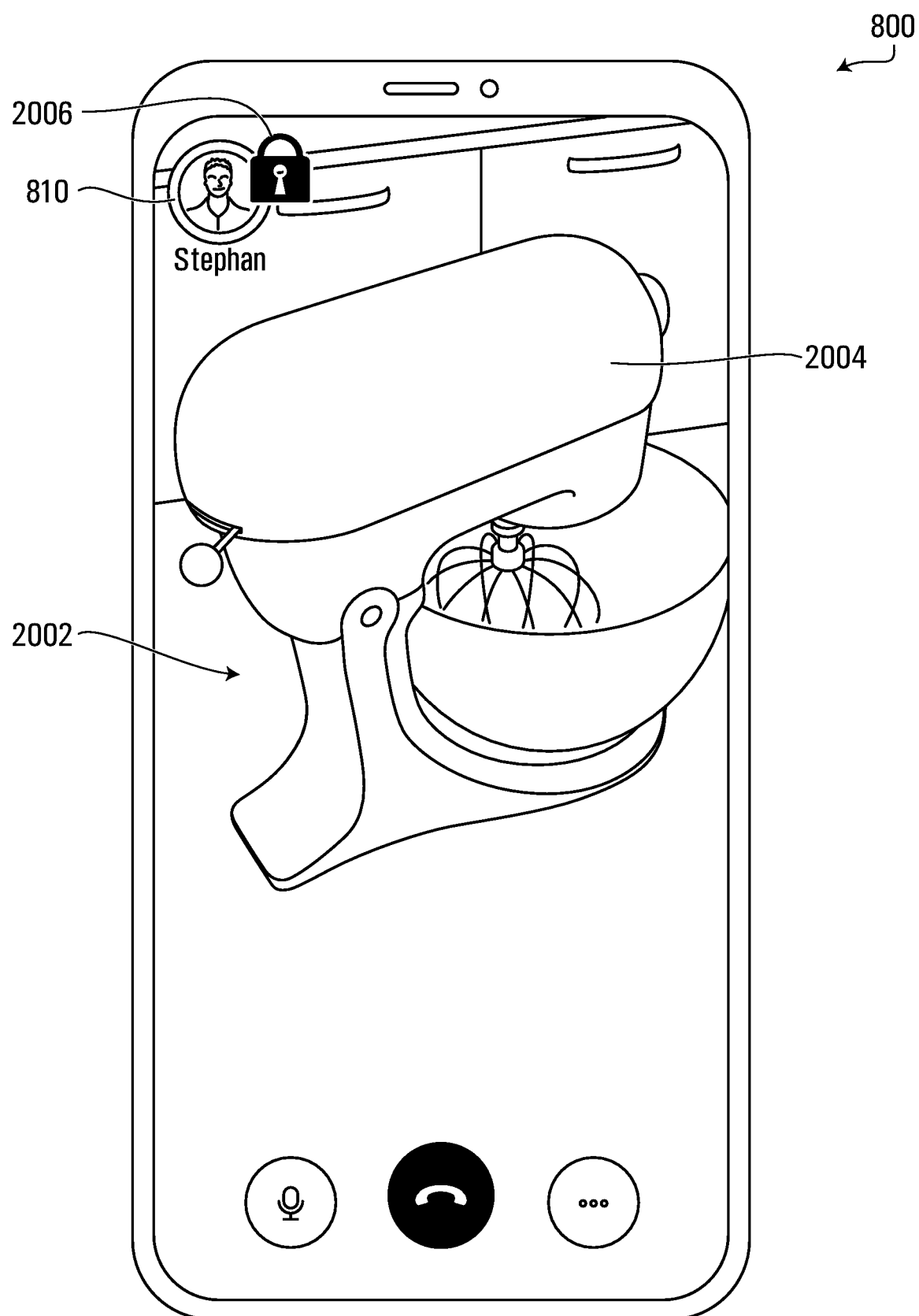
FIG. 20 illustrates the customer device of FIG. 8 displaying AR content for the shared AR experience of FIG. 7 when the customer is locked to the position of the merchant in the virtual coordinate system.

FIGS. 18 to 20 illustrate an example of user modifications in a shared AR experience. FIGS. 18 to 20 relate to the same AR experience discussed above with reference to FIGS. 7 to 10 and 12 to 16, which includes the customer and the merchant interacting with the model 702 of the stand-up kitchen mixer in the virtual coordinate system 700. The shared AR experience of FIGS. 18 to 20 could be provided, at least in part, using the method 1700.

FIG. 18 illustrates the customer device 800 displaying AR content 1802 for the customer in the shared AR experience. The AR content 1802 includes a render 1804 of the model 702 of the mixer and a virtual representation 1806 of the merchant. In some implementations, the AR content 802 is generated in step 1702 of the method 1700.

The customer device 800 in FIG. 18 further displays an option 1808 to reposition the customer to the merchant's position in the virtual coordinate system 700, and another option 1810 to lock to the merchant's position in the virtual coordinate system 700. The options 1808, 1810 could be displayed after the customer selects the virtual representation 1806 of the merchant in the AR content 1802 or the indication 810 that the merchant is present in the shared AR experience, for example.

FIG. 19 is a perspective view of the virtual coordinate system 700 of the shared AR experience after the customer has selected one of the options 1808, 1810 and has been repositioned to the position of the merchant in the virtual coordinate system 700. FIG. 19 depicts a 3D virtual model 1900 that serves to represent both the customer and the merchant as the customer and model are overlapping at the same position within the virtual coordinate system 700 in the illustrated example.

FIG. 20 illustrates the customer device 800 displaying AR content 2002 for the customer in the shared AR experience after the customer selects the option 1810 to lock to the position of the merchant in the virtual coordinate system 700. The AR content 2002 includes a render 2004 of the model 702, which is generated based on the shared position of the customer and the merchant in the virtual coordinate system 700. Virtual content can also be generated for the merchant that includes the same render 2004 of the model 702. In some implementations, the AR content 2002 is generated in step 1708 of the method 1700.

In FIG. 20, the customer device 800 further displays an indication 2006 that the position of the customer is locked to the position of the merchant. Locking to the merchant's position generally includes maintaining the customer at the merchant's position in the virtual coordinate system 700 over time after initially repositioning the customer to the merchant's position. The indication 2006 may further function as a button to unlock the customer from the position of the merchant. For example, the customer may select the indication 2006 to move independently within the virtual coordinate system once again.

According to another aspect of the present disclosure, one user in a shared AR experience can modify AR content for multiple users simultaneously. By way of example, a model defined in the virtual coordinate system of a shared AR experience may be modified based on a request from a single user. Each user's view of the model in the shared AR experience can then be altered as a result. A single user can therefore control at least part of the AR content that is generated for the multiple users in the shared AR experience. Advantageously, enabling modifications to models to be shared, linked or otherwise interrelated may improve communication and collaboration within the AR experience. For example, referring to the shared AR experience of FIG. 4, the first user could modify the orientation of the model of the mixer in the virtual coordinate system to demonstrate a certain perspective of the mixer to the second user.

Figure 21:
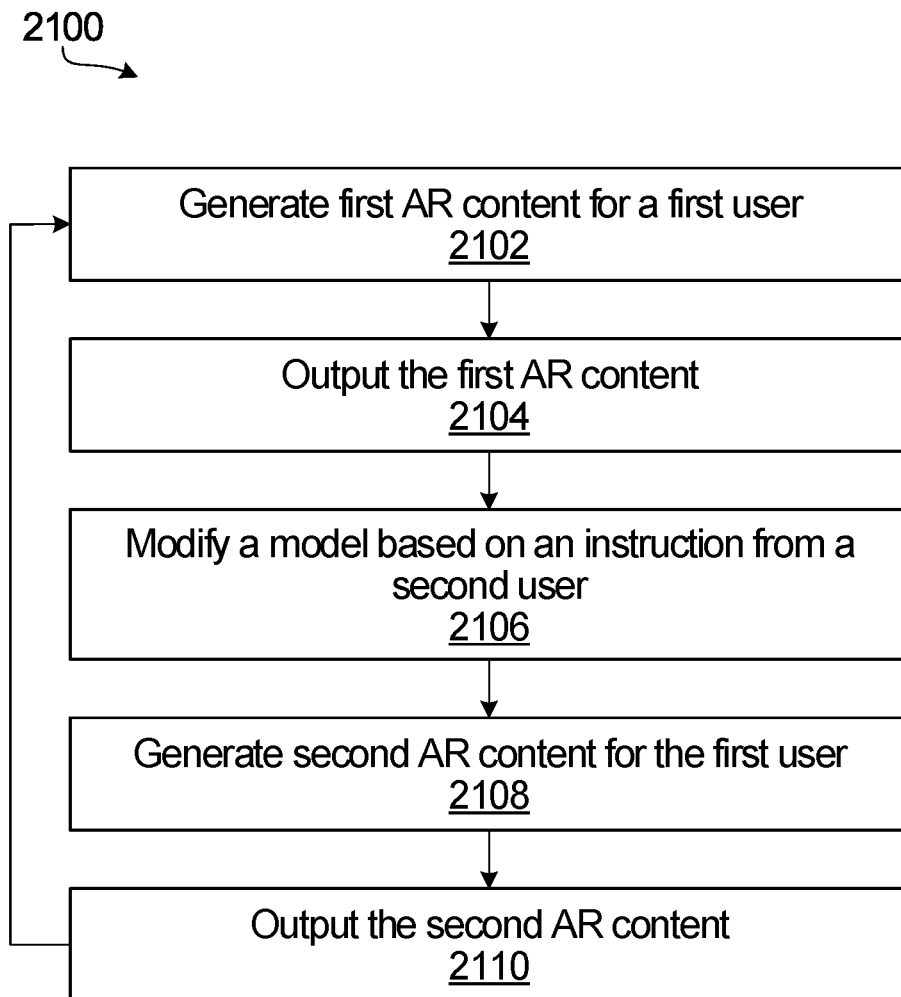
FIG. 21 is a flow diagram illustrating a method of modifying a shared AR experience, according to an embodiment.

FIG. 21 is a flow diagram illustrating a method 2100 of modifying a shared AR experience, according to an embodiment. The method 2100 will be described as being performed by the AR engine 502 of FIG. 5, with the shared AR experience including at least the first user of the user device 530a and the second user of the user device 530b. However, at least a portion of the method 2100 could instead be performed elsewhere, such as at the user device 530a and/or the user device 530b, for example.

Step 2102 includes the processor 504 generating first AR content for the first user. The first AR content includes a first render of a model anchored or defined within a virtual coordinate system of the shared AR experience. This model may be a 3D model of an item, for example. In some implementations, the first render of the model is based on the position of the first user in the virtual coordinate system and is from the viewpoint of the first user. Optionally, the first AR content can also include a virtual representation of the second user, virtual representations of one or more virtual user interactions, audio content and/or haptic content.

Step 2104 includes the processor 504 outputting the first AR content for presentation at the user device 530a. In some implementations, steps 2102, 2104 could be similar to any, some or all of steps 602, 604, 606, 608, 610, 612, 614 of the method 600 and/or steps 1106, 1108, 1110 of the method 1100.

Virtual content, such as AR content or VR content, can also be generated for the second user and presented at the user device 530b. The virtual content for the second user can include a second render of the model based on the position and viewpoint of the second user in the virtual coordinate system.

Step 2106 includes the processor 504 modifying the model to produce a modified model defined within the virtual coordinate system. Step 2106 may be performed based on an instruction obtained from the second user by the user device 530b. The instruction may be transmitted to the AR engine 502 and stored in the memory 506 or in another non-transitory computer readable medium.

Modifying the model in step 2106 can include repositioning the model within the virtual coordinate system of the AR experience. Non-limiting examples of repositioning the model within the virtual coordinate system include moving, reorienting, flipping, twisting and/or rotating the model. In some implementations, repositioning the model within the virtual coordinate system can include unanchoring the model from the virtual coordinate system while the virtual coordinate system remains fixed relative to the first user and to the second user. As a result, the model is repositioned for both the first user and the second user simultaneously based on the instruction obtained by the user device 530b.

Modifying the model in step 2106 can also or instead include manipulating or animating the model by repositioning one component of the model relative to another component of the model in the virtual coordinate system. For example, the model might include several different 3D components. The instruction obtained by the user device 530b may include a request to reposition one or some of these components within the virtual coordinate system. These components of the model may then be unanchored in the virtual coordinate system and repositioned, while the other components of the model remain fixed. This form of modification may simulate some functionality of the model. For example, an item represented by the model may be capable of performing mechanical functions in which one part of the item moves relative to another.

Modifying the model in step 2106 may, additionally or alternatively, include replacing the model with another model. For example, the original model could have been of a particular product sold by a merchant. The second user could use the user device 530b to generate an instruction to replace the original model with a model of the same product in a different color or style, or a model of a different product. In one example, the second user may be shopping for a centerpiece on a table using the shared AR experience provided by the method 2100. The second user might originally be viewing a model of a vase, and then generate an instruction to replace the model of the vase with a model of a sculpture.

Step 2108 includes generating second AR content for the first user, where the second AR content includes a render of the modified model obtained in step 2106. The second AR content is then output for presentation at the user device 530a in step 2110. Steps 2108, 2110 may be substantially similar to steps 2102, 2104, but occur after the model has been modified. Virtual content can also be generated for the second user and can include a render of the modified model.

FIGS. 22 to 29 illustrate examples of modifications to a shared AR experience, which is the same AR experience discussed above with reference to FIGS. 7 to 10, 12 to 16 and 18 to 20. The shared AR experience includes the customer and the merchant interacting with the model 702 of the stand-up kitchen mixer in the virtual coordinate system 700. The shared AR experience of FIGS. 22 to 29 could be provided, at least in part, using the method 2100.

Figure 22:
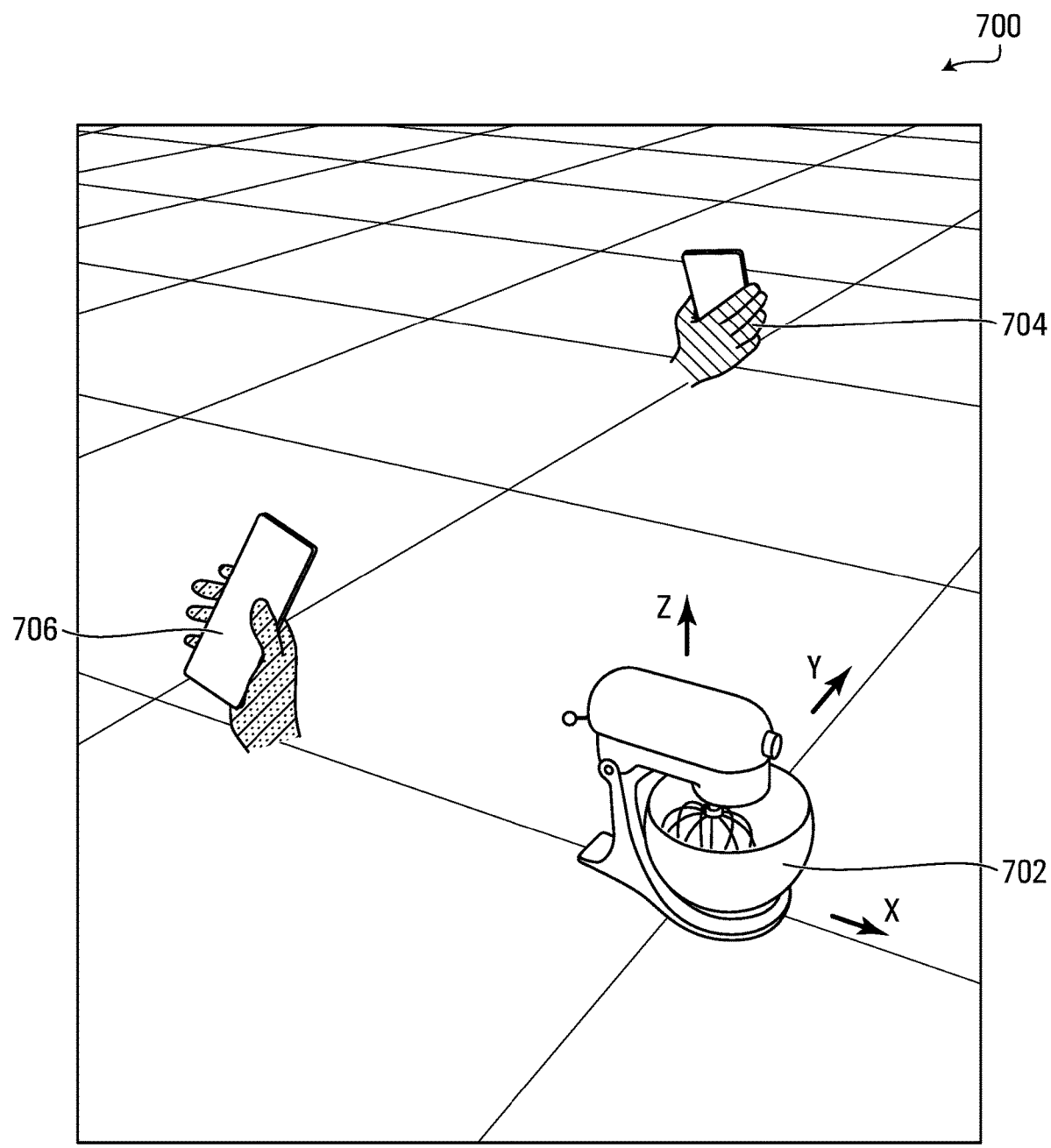
FIG. 22 is another perspective view of the virtual coordinate system for the shared AR experience of FIG. 7.
Figure 23:
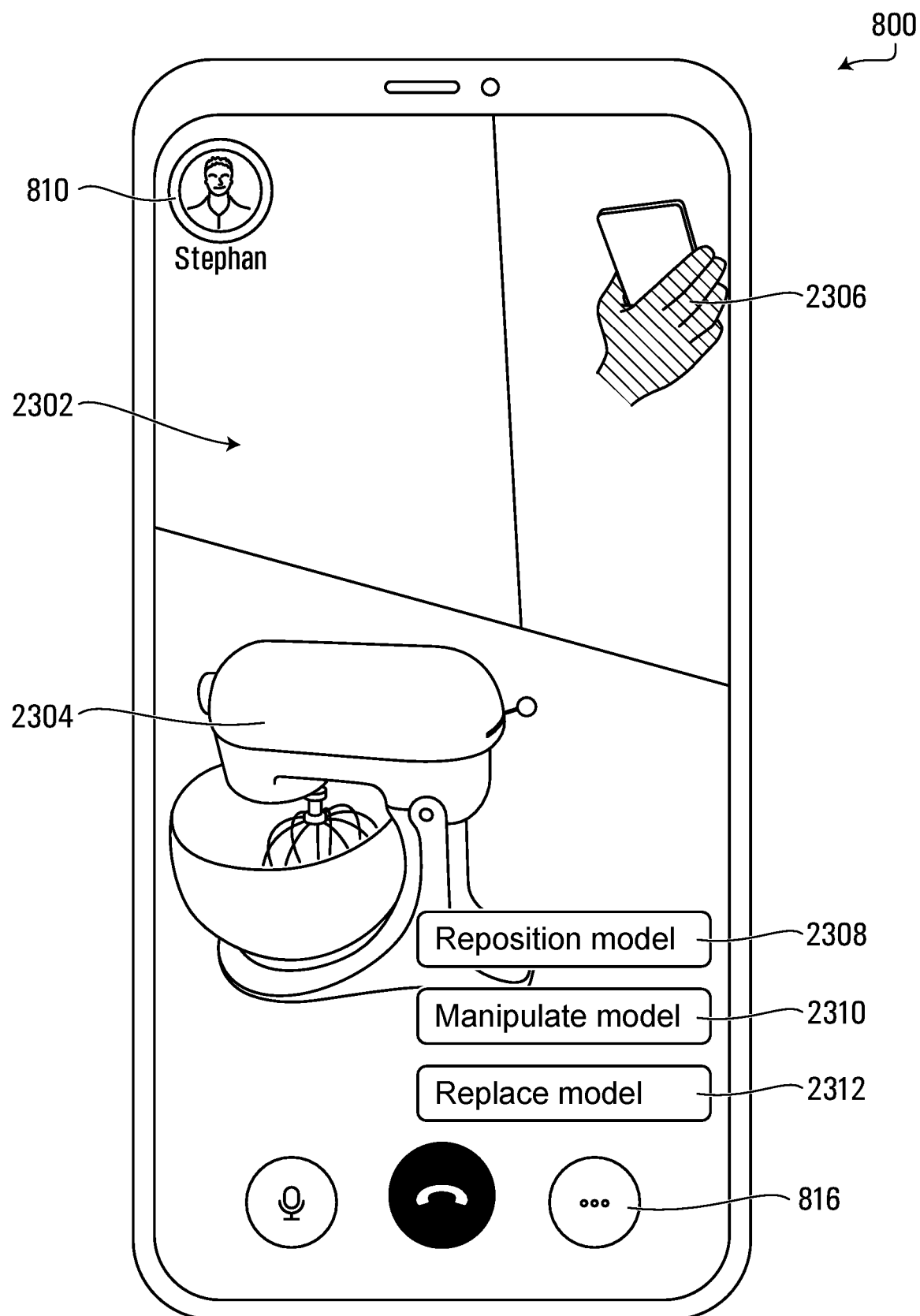
FIG. 23 illustrates the customer device of FIG. 8 displaying further AR content for the shared AR experience of FIG. 7.

FIGS. 22 and 23 illustrate the shared AR experience at a particular instance in time. FIG. 22 is a perspective view of the virtual coordinate system 700 of the shared AR experience, and FIG. 23 illustrates the customer device 800 displaying AR content 2302 for the shared AR experience. The AR content 2302 includes a render 2304 of the model of the mixer and a virtual representation 2306 of the merchant. Optionally, the AR content 2302 can further include audio content and/or haptic content. In some implementations, the AR content 2302 is generated in step 2102 of the method 2100.

The customer device 800 in FIG. 23 further displays an option 2308 to reposition the model 702 in the virtual coordinate system 700, an option 2310 to manipulate the model 702 in the virtual coordinate system 700, and an option 2312 to replace the model 702 with another model. The options 2308, 2310, 2312 could be presented to the customer if the customer selects the option 816, for example.

Figure 24:
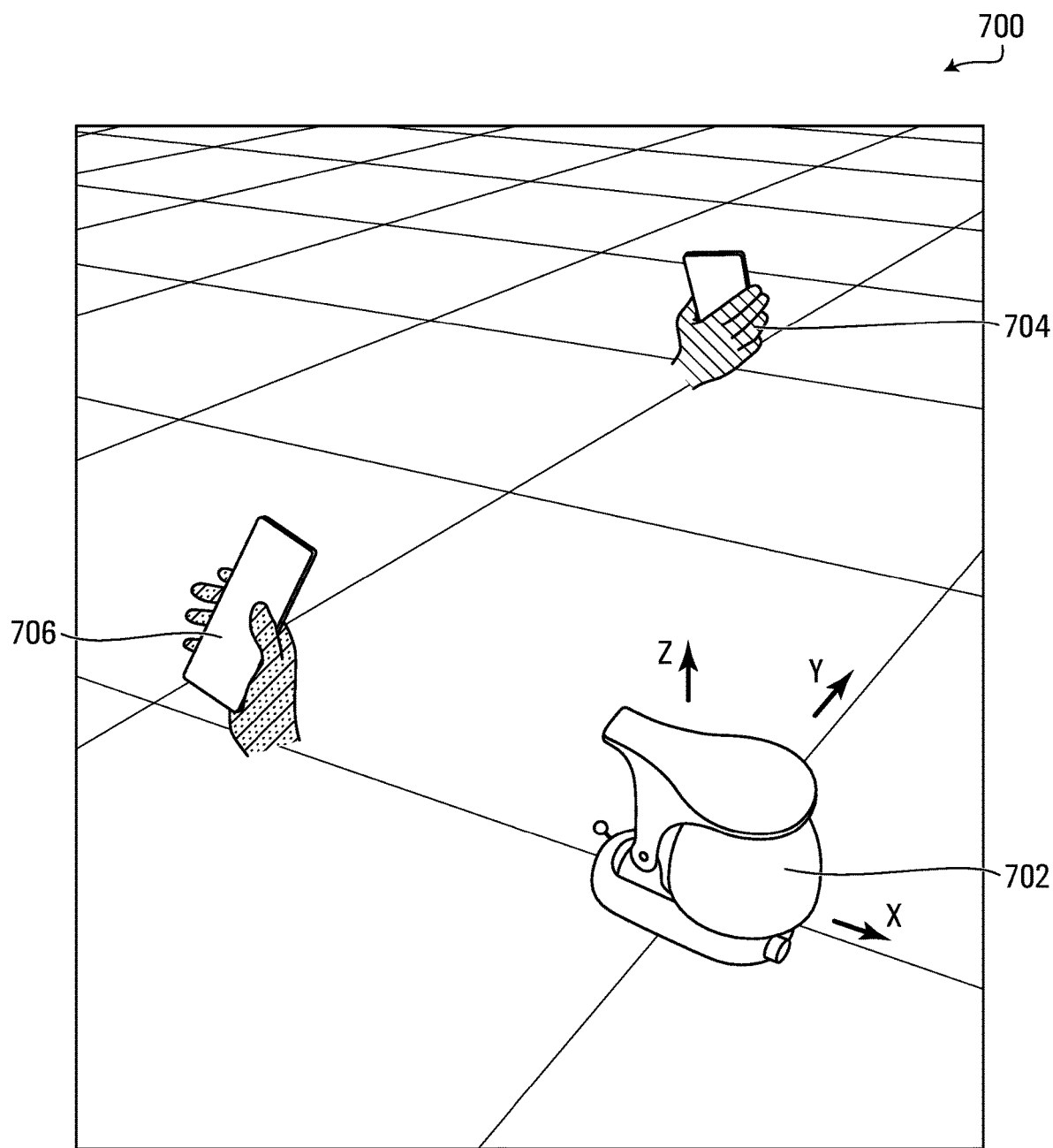
FIG. 24 is a perspective view of the virtual coordinate system for the shared AR experience of FIG. 7 after the model of the mixer has been repositioned.
Figure 25:
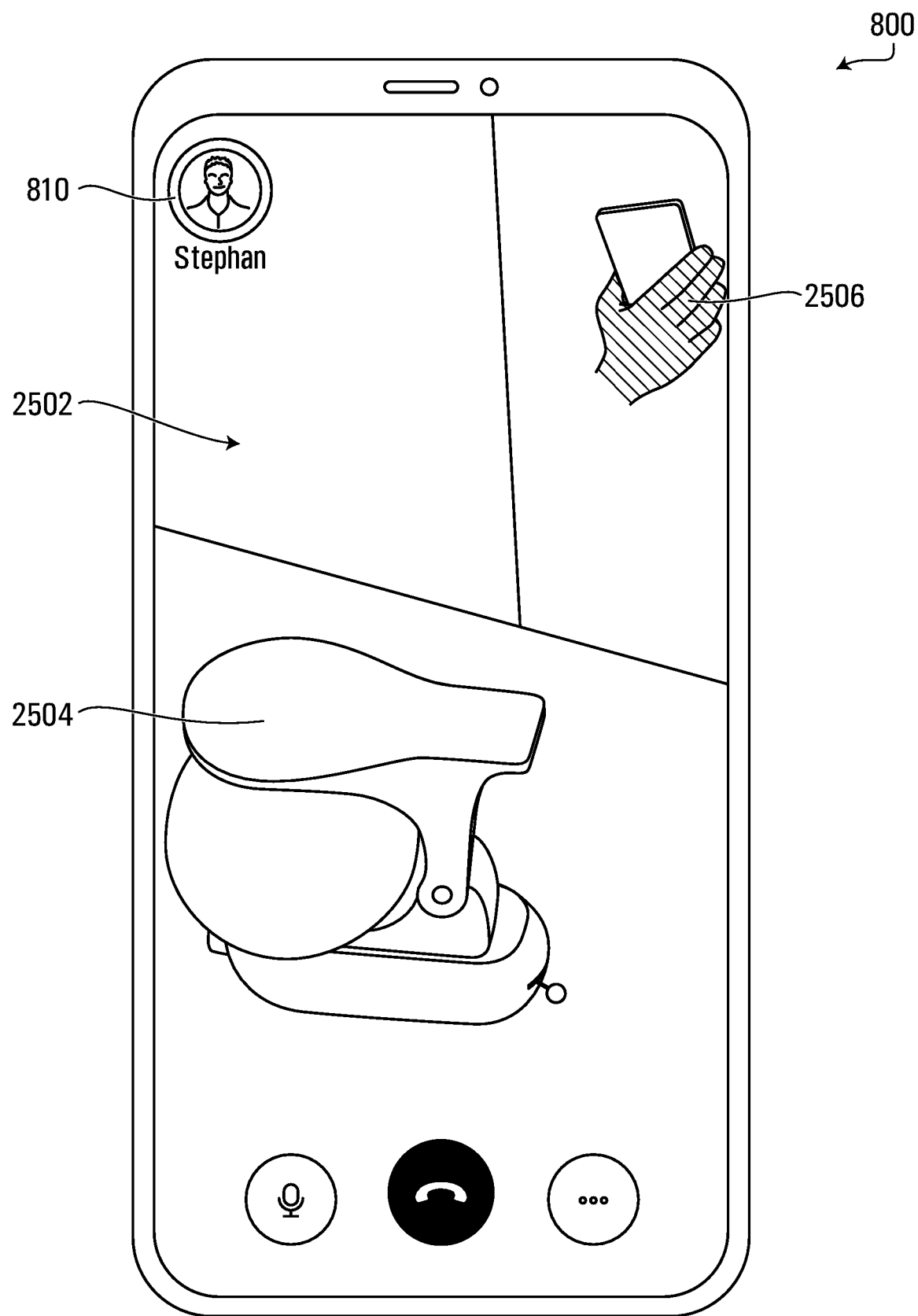
FIG. 25 illustrates the customer device of FIG. 8 displaying AR content for the shared AR experience of FIG. 7 after the model of the mixer has been repositioned.

FIGS. 24 and 25 illustrate a first example of modifying the shared AR experience for the customer and the merchant. FIG. 24 is a perspective view of the virtual coordinate system 700 for the shared AR experience after the model 702 of the mixer has been repositioned, and FIG. 25 illustrates the customer device 800 displaying AR content 2502 for the shared AR experience after the model 702 of the mixer has been repositioned. The AR content includes a render 2504 of the repositioned model 702 of the mixer and a virtual representation 2506 of the merchant. In some implementations, the AR content 2502 is generated in step 2108 of the method 2100.

As shown in FIGS. 24 and 25, the model 702 of the mixer has been repositioned (compared to the original position of the model 702 in FIGS. 22 and 23) by being flipped vertically (i.e., inverted) in the virtual coordinate system 700. As such, the customer can now see the bottom of the mixer in the render 2504. Flipping the model 702 of the mixer could have been performed based on an instruction received from the customer or from the merchant. For example, the merchant may have wanted to discuss the bottom of the mixer with the customer. Rather than instructing the customer to somehow modify their position within the virtual coordinate system 700 of the shared AR experience to view the bottom of the model 702 of the mixer (which might not even be possible), the merchant instead generated an instruction to modify the model 702 by repositioning the model 702 within the virtual coordinate system 700. This repositioning of the model 702 is reflected in the virtual content generated for the merchant and the AR content 2502 generated for the customer.

Figure 26:
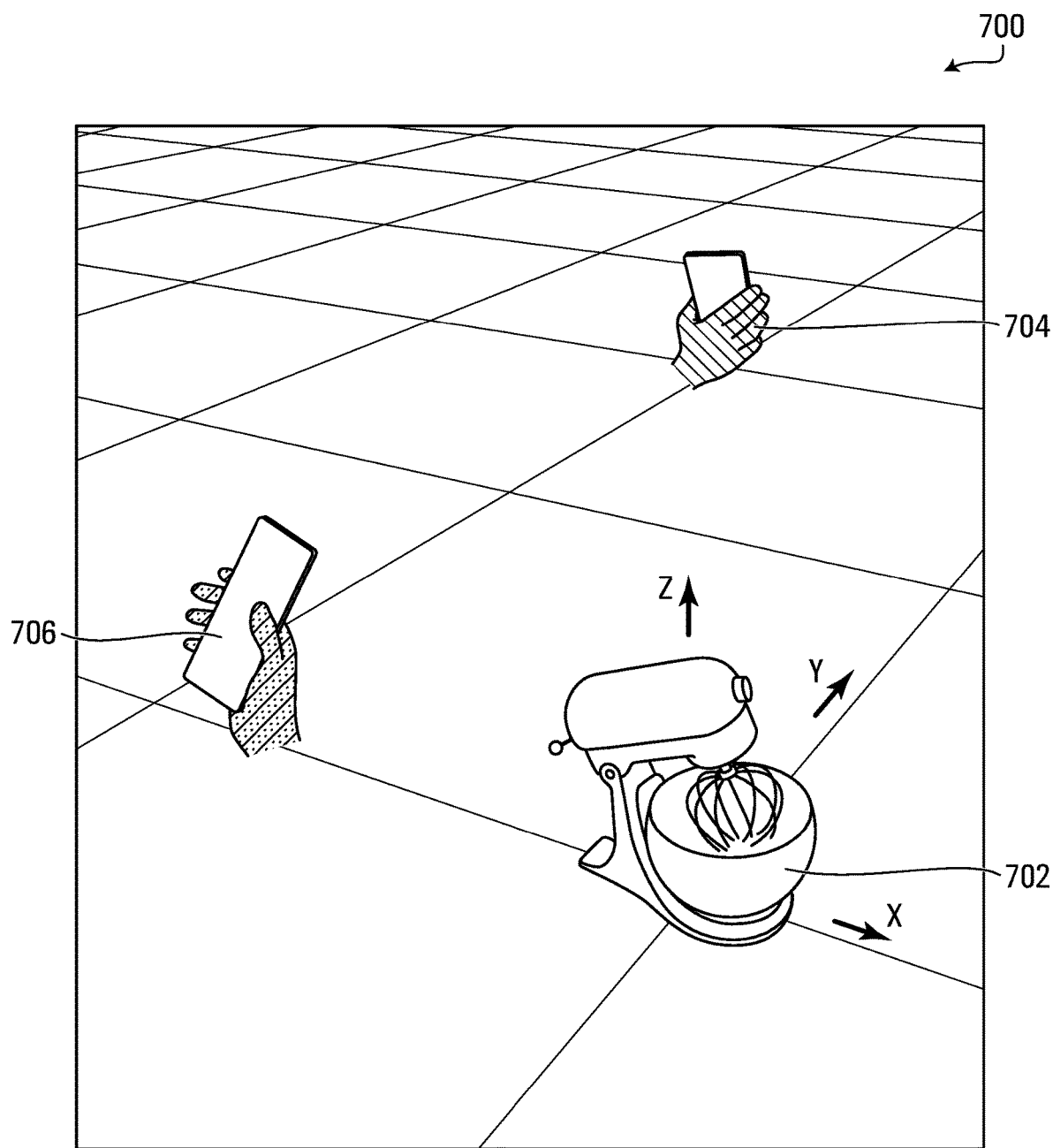
FIG. 26 is a perspective view of the virtual coordinate system for the shared AR experience of FIG. 7 after the model of the mixer has been manipulated.
Figure 27:
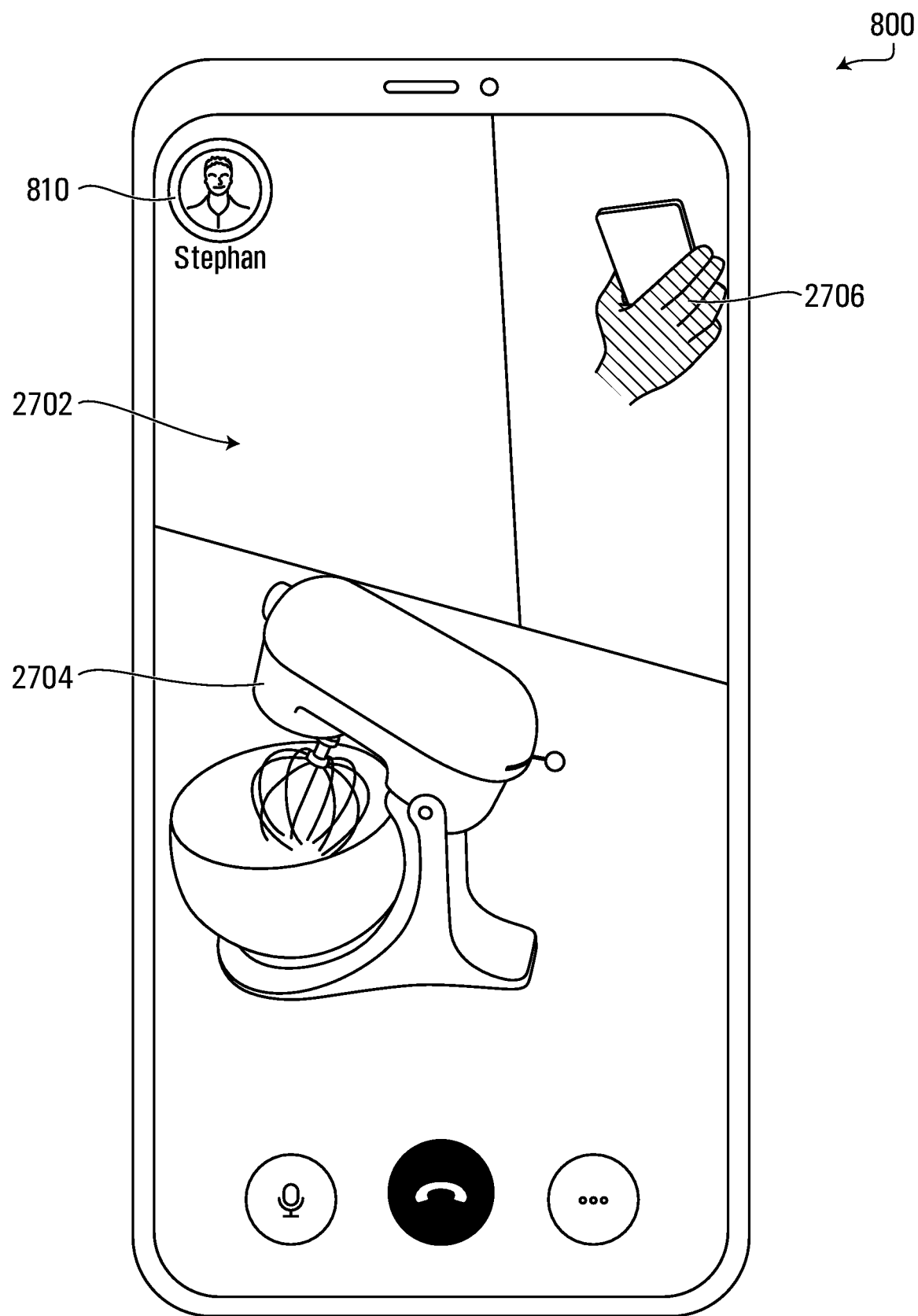
FIG. 27 illustrates the customer device of FIG. 8 displaying AR content for the shared AR experience of FIG. 7 after the model of the mixer has been manipulated.

FIGS. 26 and 27 illustrate a second example of modifying the shared AR experience for the customer and the merchant. FIG. 26 is a perspective view of the virtual coordinate system 700 for the shared AR experience after the model 702 of the mixer has been manipulated, and FIG. 27 illustrates the customer device 800 displaying AR content 2702 for the shared AR experience after the model 702 of the mixer has been manipulated. The AR content 2702 includes a render 2704 of the manipulated model 702 of the mixer and a virtual representation 2706 of the merchant. In some implementations, the AR content 2702 is generated in step 2108 of the method 2100.

As shown in FIGS. 26 and 27, the model 702 of the mixer has been manipulated by rotating the top of the mixer relative to the base of the mixer. This may simulate a real-life functionality of the mixer that allows the bowl of the mixer to be removed, which the customer can now see in the AR content 2702. From the perspective of the customer and the merchant in the shared AR experience, manipulating the model 702 may appear to be an animation of the top of the mixer moving relative to the bottom of the mixer. In some implementations, the model 702 may be a combination of multiple different models or components, and rotating the top of the mixer relative to the base of the mixer may be achieved by repositioning one or some components of the model 702 relative to the remainder of the components. For example, the top of the mixer (including the motor and the beater) could be represented by a first 3D component and the base of the mixer could be represented by a second 3D component. When coupled together, the first 3D component and the second 3D component provide the complete model 702 of the mixer. In this example, the first 3D component may be rotated relative to the second 3D component to simulate rotating the top of the mixer relative to the bottom of the mixer.

Manipulating the mixer could have been performed based on an instruction received from the customer or the merchant. For example, the merchant may have wanted to demonstrate the functionality of the mixer to the customer.

Figure 28:
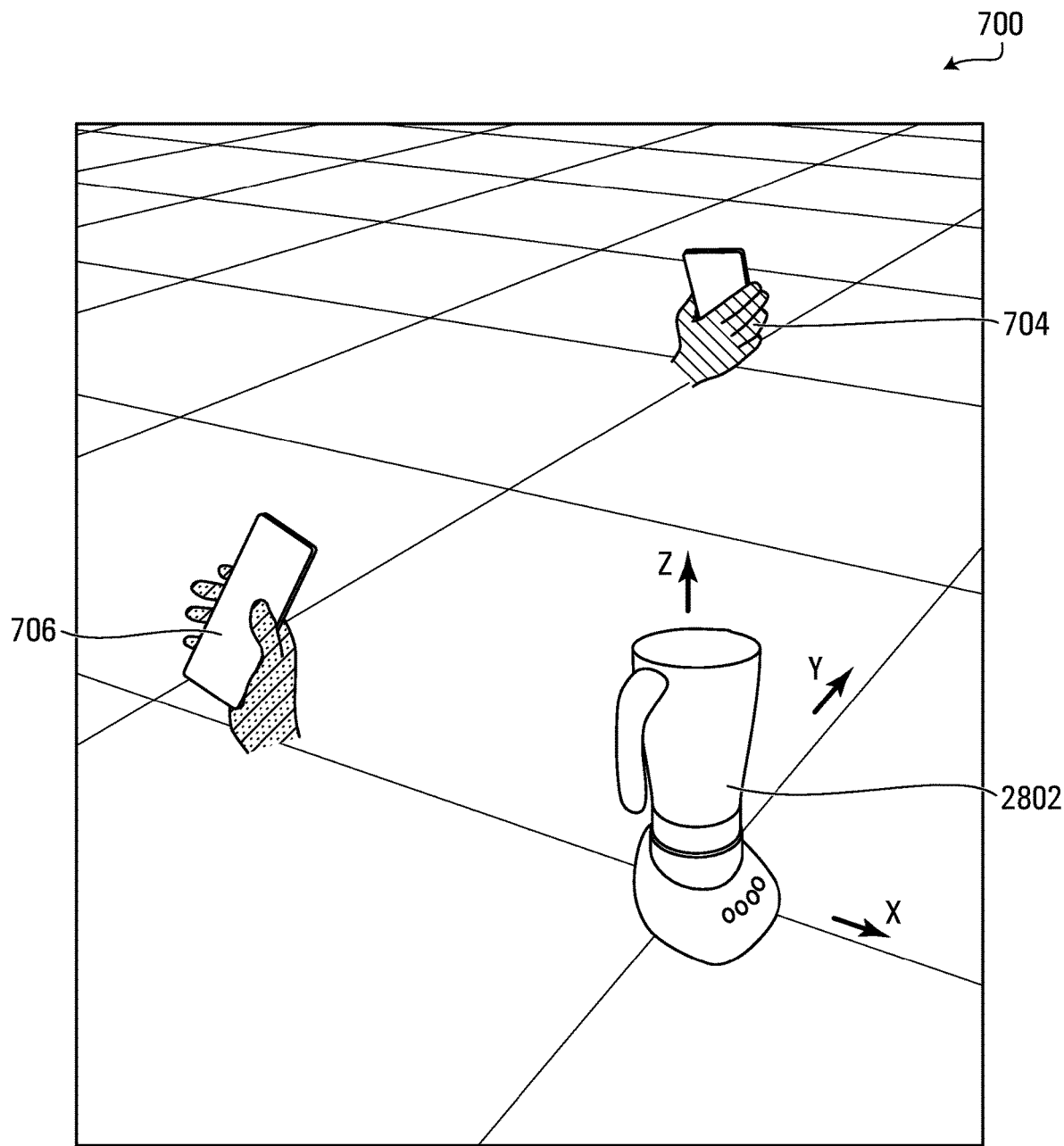
FIG. 28 is a perspective view of the virtual coordinate system for the shared AR experience of FIG. 7 after the model of the mixer has been replaced with a model of a blender.
Figure 29:
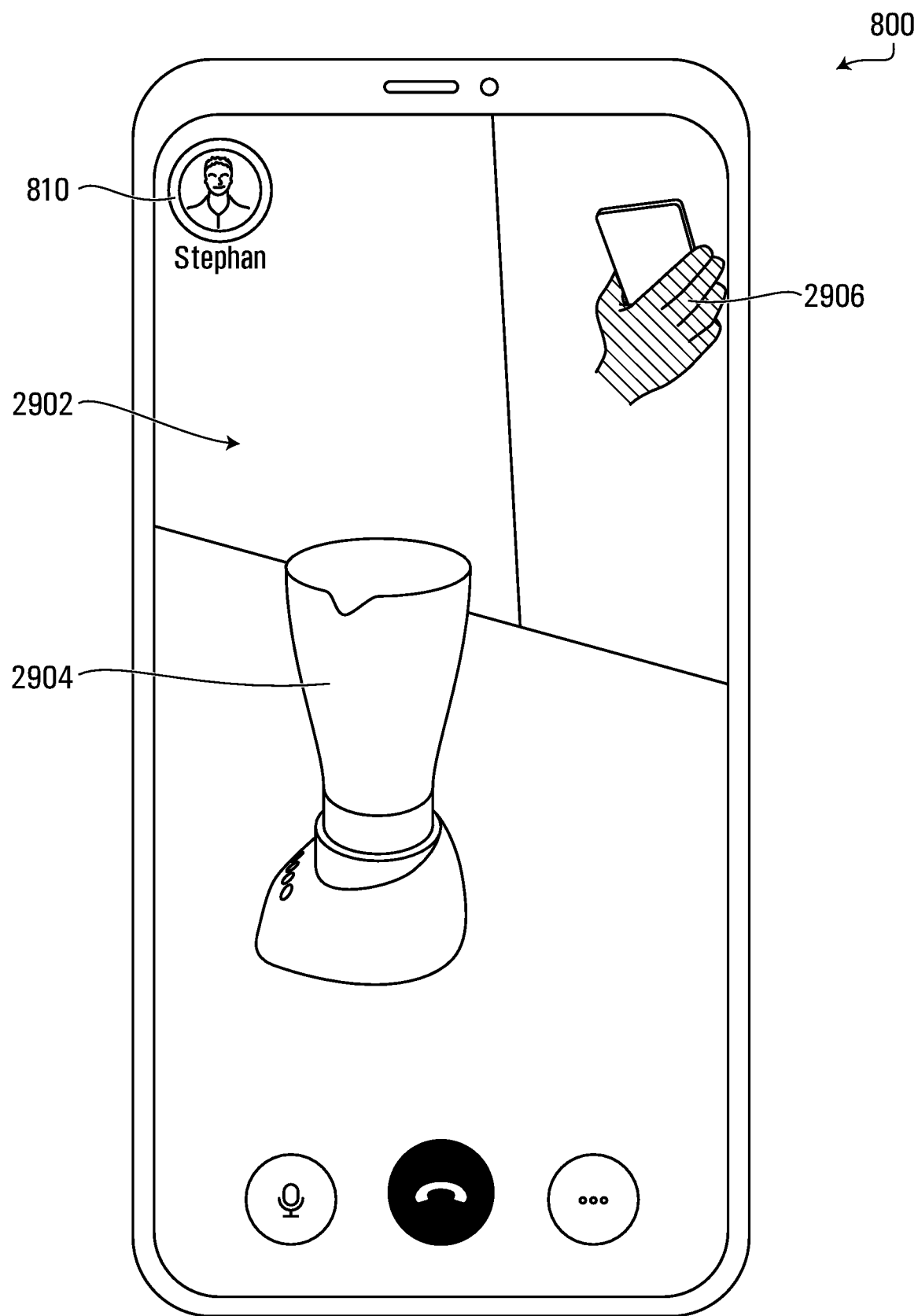
FIG. 29 illustrates the customer device of FIG. 8 displaying AR content for the shared AR experience of FIG. 7 after the model of the mixer has been replaced with the model of the blender.

FIGS. 28 and 29 illustrate a third example of modifying the shared AR experience for the customer and the merchant. FIG. 28 is a perspective view of the virtual coordinate system 700 for the shared AR experience after the model 702 of the mixer has been replaced with a model 2802 of a blender, and FIG. 29 illustrates the customer device 800 displaying AR content 2902 for the shared AR experience after the model 702 of the mixer has been replaced with the model 2802 of the blender. The AR content includes a render 2904 of the model 2802 of the blender and a virtual representation 2906 of the merchant. In some implementations, the AR content 2902 is generated in step 2108 of the method 2100.

Replacing the model 702 of the mixer with the model 2802 of the blender could have been performed based on/responsive to an instruction received from the customer or the merchant. In an example, the customer may have wanted to discuss the mixer and the blender with the merchant. After the customer has finished asking questions about the mixer, the customer may generate a request for the model 702 of the mixer to be replaced with the model 2802 of the blender. This request may be generated in response to receiving customer input through a user interface of the customer device 800. The request may then be transmitted to an AR engine generating the AR content for the customer and/or the merchant. Responsive to the request, the AR engine may modify the shared AR experience to replace the model 702 of the mixer with the model 2802 of the blender. In this example, both of the models 702, 2802 have the same position in the virtual coordinate system 700.

Conclusion

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
   obtaining a three-dimensional (3D) model of an item for sale online by a second user that is remote from a first user, the 3D model defined within a virtual coordinate system;
   determining, based on first information obtained by a first device, a position of the first user within the virtual coordinate system;
   determining, based on second information obtained by a second device, a position of the second user within the virtual coordinate system;
   obtaining, from the second device, audio of the second user;
   generating augmented reality (AR) content, the AR content comprising:
   a render of the 3D model based on the position of the first user within the virtual coordinate system,
   a virtual representation of the second user based on the position of the second user relative to the position of the first user within the virtual coordinate system, and
   audio content based on the audio of the second user, the audio content comprising a directionality corresponding to the position of the second user relative to the position of the first user within the virtual coordinate system; and
   outputting the AR content for presentation at the first device, wherein the first device is to present the render of the 3D model and the virtual representation of the second user overlaid onto a view of a real-world space associated with the first user.

2. The computer-implemented method of claim 1, wherein:
   determining the position of the second user within the virtual coordinate system comprises determining an orientation of the second user within the virtual coordinate system; and
   the virtual representation of the second user comprises an indication of the orientation of the second user.

3. The computer-implemented method of claim 1, wherein:
   the first information comprises a representation of the real-world space; and
   determining the position of the first user within the virtual coordinate system comprises:
   obtaining a position of the 3D model within the real-world space,
   mapping the virtual coordinate system to the real-world space based on the position of the 3D model within the real-world space, and
   determining a position of the first user within the real-world space, wherein the position of the first user within the virtual coordinate system is based on the position of the first user within the real-world space.

4. The computer-implemented method of claim 3, wherein determining the position of the first user within the real-world space comprises determining, based on the representation of the real-world space, a distance from a surface in the real-world space to the first user.

5. The computer-implemented method of claim 4, wherein determining the position of the first user within the real-world space comprises determining a position of the first device within the real-world space.

6. The computer-implemented method of claim 3, wherein the AR content further comprises at least a portion of the representation of the real-world space.

7. The computer-implemented method of claim 3, wherein:
   the representation of the real-world space comprises an image of the real-world space captured by the first device; and
   determining the position of the first user within the real-world space is based on image analysis of the image.

8. The computer-implemented method of claim 3, wherein:
   the real-world space is a first space;
   the second information comprises a representation of a second space, the second space being different from the first space; and obtaining the position of the second user within the virtual coordinate system comprises:
    obtaining a position of the 3D model within the second space,
    mapping the virtual coordinate system to the second space based on the position of the 3D model within the second space, and
    determining a position of the second user within the second space, wherein the position of the second user within the virtual coordinate system is based on position of the second user within the second space.

9. The computer-implemented method of claim 8, wherein the AR content is first AR content and the render is a first render, the method further comprising:
    generating second AR content, the second AR content comprising:
        a second render of the 3D model based on the position of the second user within the virtual coordinate system, and
        a representation of the first user based on the position of the first user relative to the position of the second user within the virtual coordinate system; and
    outputting the second AR content for presentation at the second device.

10. The computer-implemented method of claim 1, further comprising:
    obtaining, from the second device, an image of the second user, wherein the virtual representation of the second user comprises at least a portion of the image of the second user.

11. A system comprising:
    memory to store a three-dimensional (3D) model of an item for sale online by a second user that is remote from a first user, the 3D model being defined within a virtual coordinate system; and
    at least one processor configured to:
        determine, based on first information obtained by a first device, a position of the first user within the virtual coordinate system;
        determine, based on second information obtained by a second device, a position of the second user within the virtual coordinate system;
        obtain, from the second device, audio of the second user;
        generate augmented reality (AR) content, the AR content comprising:
            a render of the 3D model based on the position of the first user within the virtual coordinate system,
            a virtual representation of the second user based on the position of the second user relative to the position of the first user within the virtual coordinate system, and
            audio content based on the audio of the second user, the audio content comprising a directionality corresponding to the position of the second user relative to the position of the first user within the virtual coordinate system; and
        output the AR content for presentation at the first device, wherein the first device is to present the render of the 3D model and the virtual representation of the second user overlaid onto a view of a real-world space associated with the first user.

12. The system of claim 11, wherein:
the position of the second user within the virtual coordinate system comprises an orientation of the second user within the virtual coordinate system; and the virtual representation of the second user comprises an indication of the orientation of the second user.

13. The system of claim 11, wherein:
the first information comprises a representation of a real-world space; and
the at least one processor is further configured to:
    obtain a position of the 3D model within the real-world space,
    map the virtual coordinate system to the real-world space based on the position of the 3D model within the real-world space, and
    determine a position of the first user within the real-world space, wherein the position of the first user within the virtual coordinate system is based on the position of the first user within the real-world space.

14. The system of claim 13, wherein the position of the first user within the real-world space is based on distance from a surface in the real-world space to the first user.

15. The system of claim 14, wherein the position of the first user within the real-world space comprises a position of the first device within the real-world space.

16. The system of claim 13, wherein the AR content further comprises at least a portion of the representation of the real-world space.

17. The system of claim 13, wherein:
the representation of the real-world space comprises an image of the real-world space captured by the first device; and
the position of the first user within the real-world space is based on image analysis of the image.

18. The system of claim 13, wherein:
the real-world space is a first space;
the second information comprises a representation of a second space, the second space being different from the first space; and
at the at least one processor is further configured to:
    obtain a position of the 3D model within the second space,
    map the virtual coordinate system to the second space based on the position of the 3D model within the second space, and
    determine a position of the second user within the second space, wherein the position of the second user within the virtual coordinate system is based on position of the second user within the second space.

19. The system of claim 18, wherein the AR content is first AR content, the render is a first render, and the at least one processor is further configured to:
    generate second AR content, the second AR content comprising:
        a second render of the 3D model based on the position of the second user within the virtual coordinate system, and
        a representation of the first user based on the position of the first user relative to the position of the second user within the virtual coordinate system; and
    output the second AR content for presentation at the second device.

20. The system of claim 11, wherein the at least one processor is further configured to obtain, from the second device, an image of the second user, wherein the virtual representation of the second user comprises at least a portion of the image of the second user.

21. A non-transitory computer readable medium storing computer executable instructions which, when executed by a computer, cause the computer to:

obtain a three-dimensional (3D) model of an item for sale online by a second user that is remote from a first user, the 3D model defined within a virtual coordinate system;

determine, based on first information obtained by a first device, a position of the first user within the virtual coordinate system;

determine, based on second information obtained by a second device, a position of the second user within the virtual coordinate system;

obtain, from the second device, audio of the second user;

generate augmented reality (AR) content, the AR content comprising:
- a render of the 3D model based on the position of the first user within the virtual coordinate system,
- a virtual representation of the second user based on the position of the second user relative to the position of the first user within the virtual coordinate system, and
- audio content based on the audio of the second user, the audio content comprising a directionality corresponding to the position of the second user relative to the position of the first user within the virtual coordinate system; and output the AR content for presentation at the first device, wherein the first device is to present the render of the 3D model and the virtual representation of the second user overlaid onto a view of a real-world space associated with the first user.

* * * * *